United States Patent [19]

Grossberg et al.

[11] Patent Number: 4,803,736

[45] Date of Patent: Feb. 7, 1989

[54] NEURAL NETWORKS FOR MACHINE VISION

[75] Inventors: Stephen Grossberg, Newton Highlands; Ennio Mingolla, Newton, both of Mass.

[73] Assignee: The Trustees of Boston University, Boston, Mass.

[21] Appl. No.: 102,018

[22] Filed: Jul. 23, 1987

Related U.S. Application Data

[63] Continuation-in-part of Ser. No. 802,777, Nov. 27, 1985, abandoned.

[30] Foreign Application Priority Data

Nov. 26, 1986 [WO] PCT Int'l Appl. .................. PCT/US86/02556

[51] Int. Cl.[4] ............................................. G06K 9/48
[52] U.S. Cl. ......................................... 382/22; 382/54
[58] Field of Search ................... 382/10, 15, 36, 22, 382/54

[56] References Cited

U.S. PATENT DOCUMENTS 4,083,035 4/1978 Riganati et al. ..................... 382/5
4,658,372 4/1987 Witkin .................................. 382/36

OTHER PUBLICATIONS

M. A. Cohen et al, "Neural Dynamics of Brightness Perception: Features Boundaries, Diffusion, and Resonance", Perception and Psychophysics, vol. 36., No. 5, May 1984 pp. 428–456.

*Primary Examiner*—Theodore M. Blum
*Attorney, Agent, or Firm*—Hamilton, Brook, Smith & Reynolds

[57] ABSTRACT

Network interactions within a Boundary Contour (BC) System, a Feature Contour (FC) System, and an Object Recognition (OR) System are employed to provide a computer vision system capable of recognizing emerging segmentations. The BC System is defined by a hierarchy of orientationally tuned interactions, which can be divided into two successive subsystems called the OC filter and the CC loop. The OC filter contains oriented receptive fields or masks, which are sensitive to different properties of image contrasts. The OC filter generates inputs to the CC loop, which contains successive stages of spatially shore-range competitive interactions and spatially long-range cooperative interactions. Feedback between the competitive and cooperative stages synthesizes a global context-sensitive segmentation from among the many possible groupings of local featural elements.

7 Claims, 15 Drawing Sheets

OUT FIELD
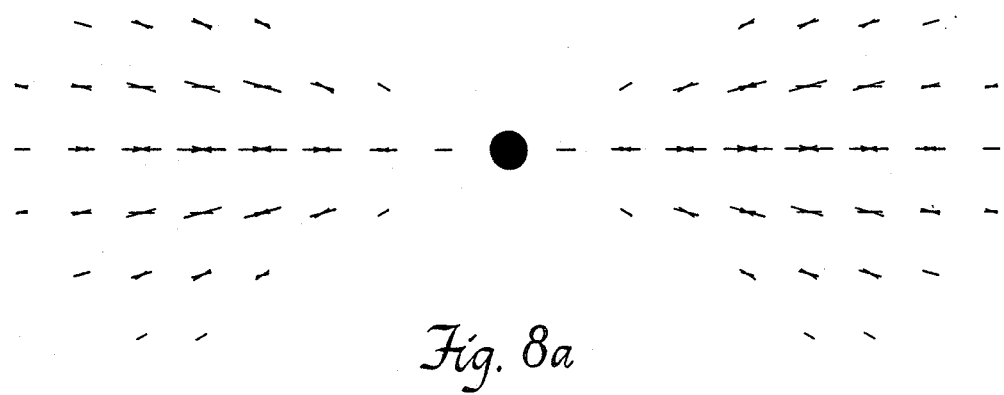
*Fig. 8a*
*Fig. 7*
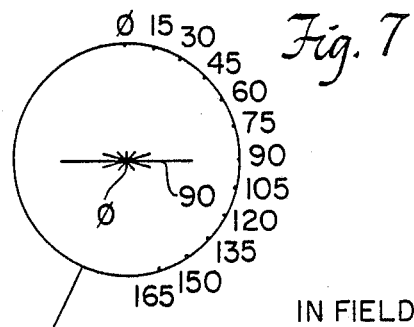
IN FIELD
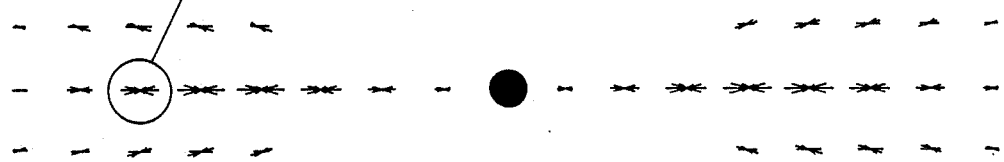
*Fig. 8b*

INPUT TO COMPETITION I

COMPETITION I

COMPETITION II

COOPERATION

INPUT TO COMPETITION I

COMPETITION I

COMPETITION II

COOPERATION

INPUT TO COMPETITION I

COMPETITION I

COMPETITION II

COOPERATION

INPUT TO COMPETITION I

COMPETITION I

COMPETITION II

COOPERATION

INPUT TO COMPETITION I

COMPETITION I

COMPETITION II

COOPERATION

INPUT TO COMPETITION I

COMPETITION I

COMPETITION II

COOPERATION

INPUT TO COMPETITION I

COMPETITION I

COMPETITION II

COOPERATION

INPUT TO COMPETITION I

COMPETITION I

COMPETITION II

COOPERATION

NEURAL NETWORKS FOR MACHINE VISION

DESCRIPTION

GOVERNMENT SUPPORT

The U.S. Government has rights to this invention under AFOSR85-0149 and DAAG-29-85-K-0095 government contracts.

RELATED APPLICATIONS

This is a continuation-in-part of U.S. application Ser. No. 802,777 filed Nov. 27, 1985. Other related applications incorporated herein by reference are U.S. Ser. No. 802,576 filed Nov. 27, 1985 entitled "Neural Dynamics of Category Hearing and Recognition: Attention, Memory Consolidation and Amnesia", U.S. Ser. No. 802,479 filed Nov. 27, 1985 entitled "Neural Dynamics of Speech and Language Coding: Developmental Programs, Perceptual Grouping, and Competition for Short Term Memory, and U.S. Ser. No. 808,055 filed Dec. 12, 1985 entitled "Massively Parallel Real-Time Network Architectures for Robots Capable of Self-Calibrating Their Operating Parameters Through Associative Learning".

RELATED PUBLICATIONS

The following publications describe features of this invention and are incorporated herein by reference:

Grossberg, S. and Mingolla, E., "Neural Dynamics of Form Perception: Boundary Completion, Illusory Figures, and Neon Color Spreading", *Psychological Review*, 92, 173-211 (1985a), Grossberg, S. and Mingolla, E., "Neural Dynamics of Perceptual Grouping: Textures, Boundaries, and Emergent Segmentations", *Perception & Psychophysics*, 38(2), 141-171, (1985), and Grossberg, S. and Mingolla, E., "Neural Dynamics of Surface Perception: Boundary Webs, Illuminants, and Shape-From-Shading", *Computer Vision, Graphics, and Image Processing*, July 1986.

BACKGROUND ART

This invention relates to a real-time image processing system for use in computer vision systems and artificial intelligence systems. A great deal of investigatory work and research has been expended in attempting to understand the biological visual system. Apart from the intrinsic value of the knowledge gained by such an understanding, it is hoped that the knowledge gained can be applied to produce man-made machines to simulate the biological visual system by a combination of opto-electronic devices and computer data processing techniques to thereby achieve the efficiency inherent in biological visual systems.

The research resulting in the development of the present invention is specifically directed to an understanding of how perceptual grouping occurs in the biological visual system context.

The visual system segments optical input into regions that are separated by perceived contours or boundaries. This rapid, seemingly automatic, early step in visual processing is difficult to characterize, largely because many perceived contours have no obvious correlates in the optical input. A contour in a pattern of luminances is generally defined as a spatial discontinuity in luminance. Although usually sufficient, however, such discontinuities are by no means necessary for sustaining perceived contours. Regions separated by visual contours also occur in the presence of: statistical differences in textural qualities (such as orientation, shape, density, or color), binocular matching of elements of differing disparities, accretion and deletion of texture elements in moving displays, and classical "subjective contours". The extent to which the types of perceived contours just named involve the same visual processes as those triggered by luminance contours is not obvious, although the former are certainly as perceptually real and generally as vivid as the latter.

The visual system's segmentation of the scenic input occurs rapidly throughout all regions of that input, in a manner often described as "preattentive." That is, subjects generally describe boundaries in a consistent manner when exposure times are short (under 200 msec) and without prior knowledge of the regions in a display at which boundaries are likely to occur. Thus, any theoretical account of boundary extraction for such displays must explain how early "data driven" processes rapidly converge on boundaries wherever they occur.

The second finding of the experimental work on textures complicates the implications of the first, however: the textural segmentation process is exquisitely context-sensitive. That is, a given texture element at a given location can be part of a variety of larger groupings, depending on what surrounds it. Indeed, the precise determination even of what acts as an element at a given location can depend on patterns at nearby locations.

One of the greatest sources of difficulty in understanding visual perception and in designing fast object recognition systems is such context sensitivity of perceptual units. Since the work of Gestaltists, it has been widely recognized that local features of a scene, such as edge positions, disparities, lengths, orientations, and contrasts, are perceptually ambiguous, but that combinations of these features can be quickly grouped by a perceiver to generate a clear separation between figures or between figure and ground. Indeed, a figure within a textured scene often seems to "pop out" from the ground. The "emergent" features by which an observer perceptually groups the "local" features within a scene are sensitive to the global structuring of textural elements within the scene.

The fact that these emergent perceptual units, rather than local features, are used to group a scene carriers with it the possibility of scientific chaos. If every scene can define its own context-sensitive units, then perhaps object perception can only be described in terms of an unwieldy taxonomy of scenes and their unique perceptual units. One of the great accomplishments of the Gestaltists was to suggest a short list of rules for perceptual grouping that helped to organize many interesting examples. As is often the case in pioneering work, the rules were neither always obeyed nor exhaustive. No justification for the rules was given other than their evident plausibility. More seriously for practical applications, no effective computational algorithms were given to instantiate the rules.

The collective effect of these contributions has been to provide a sophisticated experimental literature about textural grouping which has identified the main properties that need to be considered. What has not been achieved is a deep analysis of the design principles and mechanisms that lie behind the properties of perceptual grouping. Expressed in another way, what is missing is the raison d'etre for textural grouping and a computational framework that dynamically explains how textural elements are grouped, in real-time, into easily separated figures and ground.

One manifestation of this gap in contemporary understanding can be found in the image-processing models that have been developed by workers in artificial intelligence. In this approach, curves are analyzed using models different from those that are used to analyze textures, and textures are analyzed using models different from the ones used to analyze surfaces. All of these models are built up using geometrical ideas—such as surface normal, curvature, and Laplacian—that were used to study visual perception during the 19th century. These geometrical ideas were originally developed to analyze local properties of physical processes. By contrast, the visual system's context-sensitive mechanisms routinely synthesize figural percepts that are not reducible to local luminance differences within a scenic image. Such emergent properties are not just the effect of local geometrical transformations.

DISCLOSURE OF THE INVENTION

More recently, it has been found that the 19th century geometrical ideas are fundamentally inadequate to characterize the designs that make biological visual systems so efficient. This statement arises from our discovery of new mechanisms that do not depend upon local computation of geometrical properties of a scenic image. Rather, these mechanisms are defined by parallel and hierarchical interactions within very large networks of interacting neurons. In accordance with the invention, these interactions can be defined by a set of equations simulating the network interactions of the biological system in recognizing textures, boundaries and emergent segmentations. The visual properties that these equations compute emerge from network interactions, rather than from local transformations.

A surprising consequence of our analysis is that the same mechanisms that are needed to achieve a biologically relevant understanding of how scenic edges are internally represented also respond intelligently to textured images, smoothly shaded images, and combinations thereof.

The method and apparatus of the invention comprises, in general, a Boundary Contour System for a simulated neural network for a machine vision system. The vision system is comprised of two parallel contour extracting processes; the Boundary Contour System (BC System) of this invention and a Feature Contour System (FC System). The BC System of the invention accepts pre-processed pixel information in the form of a matrix of pixel values defining the image. Based upon such pixel information, the BC System generates BC signals defining the boundaries of perceptual domains deemed to be perceptually significant in the image. The FC System accepts the same pixel information and generates featured contour signals which define the featural qualities, i.e., color or brightness, that pervade the perceptual domains defined by the boundary contour signals.

The BC System is comprised of an oriented contrast sensitive filter (OC filter), two competitive stages, a cooperative stage and an orientational feedback loop. The OC filter comprises an array consisting of families of N oriented masks, or elongated receptive fields, with each mask family corresponding to a respective node position (i,j) relative to the image being processed. Each N mask within a family corresponds to a different band of edge orientations (vertical, horizontal, 45°, etc.) relative to the image. Each mask weights, or encodes, the pixel intensities in accordance with a predetermined oriented spatial weighting function, to provide an output signal proportional to the degree of congruence between the masks weighting function and the distribution of contrasts in the region sampled by the mask weighting function. For example, a vertically oriented mask will tend to have a strong response and output in the presence of a light-to-dark vertical edge within its receptive field.

At the first stage of the OC filter, each oriented mask is sensitive, or responsive, to the position, the orientation, the amount of contrast and the direction of contrast at an edge of a visual scene.

To obtain a mask output insensitive to direction of contrast, two subsets of each N mask are provided corresponding to each position and orientation. One subset responds only to light-to-dark contrasts; the other to dark-to-light contrasts. The outputs of the subsets of the oriented masks, responsive to similar positions and orientations, but opposite directions of contrast, are summed to provide an input excitation signal to successive competitive stages. Each mask within a family provides a spatially elongated weighting function corresponding to a different orientation (k) relative to the image, thereby producing an output signal proportional to the degree of congruence between the mask weighting function and the distribution of contrasts in the region of the image intersected, or sampled, by the mask weighting function. This weighted signal is the input signal to the first of successive competitive stages and is insensitive to direction of contrast, but proportional to the amount of contrast at each node (i,j,k), where i and j denote spatial position and k denotes orientation. Thus, a vertical boundary contour can be activated by either a close-to-vertical, light-to-dark edge or a close-to-vertical, dark-to-light edge at a fixed scenic position.

The competitive stages consist, in general, of two successive stages of orientationally specific competition between proximate, or nearby, nodes. At the first stage, the competition is between nodes at neighboring positions that are tuned to the same orientation. Note: because of the close analogy between network terminology and living cell terminology, the terms nodes and cells are used interchangeably throughout. At the first competitive stage, an array of network nodes is provided to which the mask output signals are coupled. A mask signal at node (i,j) of a given, or fixed, orientation k at the OC filter tends to induce or excite a signal of like orientation k at its nodal position i,j, in the competitive stage, but tends to inhibit or negate signals of like orientation at proximate, or nearby nodal locations.

The output signals from the first competitive stage form the input for a second array of network nodes forming the second competitive stage. In this and all subsequent stages, the nodes correspond one-to-one with those of the first competitive stage with respect to coding (labeling) for position i,j and orientation k. At the second competitive stage, however, incoming signals of each orientation k tend to inhibit incoming signals of orientation $p\neq k$ at each position i,j of the second competitive stage. Thus, a node signal from the first competitive stage, indicating, for example, a vertical orientation tends to activate a vertically oriented node signal at the second competitive stage, and inhibits all other orientations at the same location. In addition, if the output signal at position (i,j) from the first competitive stage indicates an orientation k; then an output signal of the perpendicular orientation K, which is orthogonal to k, is inhibited even more strongly then other orientations at the second stage. Also, if a given orientation K at the second competitive stage is inhibited, the orthogonal or perpendicular orientation k tends to be disinhibited. A normalization process occurs at the second competitive stage which insures that the total source of activity resulting from all orientations for a given position (i,j) is bounded.

The value of the output of the second competitive stage is therefore proportional to the ratio of a given activated orientation with respect to the sum of all of the other activated orientations at that location.

The cooperative stage is the most complex and computationally intensive stage. The cooperative stage also comprises an array of network nodes corresponding one-to-one with the network nodes of the first or second stage with respect to position (i,j) and orientation (k). The function of the cooperative stage is to complete boundaries over gaps by creating "oriented edges", or contours, where enough statistical data is generated by the system to warrant such completion. By oriented edge is meant an activation or pattern among nodes (i,j,k) wherein activity in adjacent spatially aligned nodes, roughly in the orientation k, is strongest in those individual nodes of orientation k.

In this cooperative stage, the overall activity pattern at a set of cells, or nodes, tries to align itself so that its dominant active orientation, k, is consistent with that of proximate and distant neighbor cells. If, on both sides of a cell there are many oriented cells that are aligned, then the cell will increase its activity, i.e., strength of its output signal to the same or similarly oriented cells surrounding it. This creates an orientational momentum in a given direction. It is important that the statistical data warranting boundary completion (i.e., orientational momentum) exist on both sides of the cell. The orientational momentum must also align itself with the cell receiving the activity. The cell alignment and the orientations do not have to concur exactly; slight mismatches are allowed. The amount of mismatch is determined by model parameters. The surrounding distance in which a cell "looks" for aligned neighbors is also a model parameter.

The foregoing is accomplished by coupling orientally encoded signals from each node i,j,k of the second competitive stage to a cooperative stage comprising a third array of network nodes. Nodes of the cooperative stage sense long range statistical alignment among the oriented node activities encoded in the set of signals emanating from the second competitive stage. By "long range" is meant that signals from distant nodes up to several times the length of the nodes considered in the short range interactions of the two competitive stages, are included in the process.

This weighting is accomplished in two separate long range spatial domains (for example, a left and right domain) for each processing node at the cooperative stage. Thus, for example, a horizontally aligned receptive cooperative cell computes separate weighted sums for inputs from cells to the left and inputs from cells to the right of its corresponding nodal cell at the competitive stage.

Next, the weighted sums are transformed, or clipped, to insure that the weighted signals from each domain will not exceed a fixed (constant) value. The transformed signals from each side are summed. Summing assures that sufficiently positive input activity has occurred in both spatial domains, simultaneously, to warrant a boundary completion signal to fill in a gap. If the sum exceeds a fixed value, then the cooperative node will provide a feedback signal.

These feedback signals are sharpened by an on-center off-surround network in the feedback path, similar to the action of the first competitive stage before being passed to the second competitive stage. The feedback signals from each cooperative node combines with the still present signals originating from the oriented contrast driven cells of the OC filter and transduced by the first competitive stage to modify the pattern of activity at the second competitive stage, in accordance with the sensed long-range statistical data. This, in turn, causes a revision of the output from the second competitive stage resulting in revised feedback information, until equilibrium is rapidly reached.

BRIEF DESCRIPTION OF THE DRAWINGS

FIG. 2 is an example of featural filling-in.

FIG. 7 is an enlarged view of a portion of FIG. 8B showing certain details of the symbology used therein.

FIGS. 8A and 8B, respectively, illustrate the results of a computer simulation of a cooperative out-field (8A) and in-field (8B) used to generate the emergent groupings illustrated in FIGS. 10–17.

BEST MODE OF CARRYING OUT THE INVENTION

I. System In General

Figure 1:
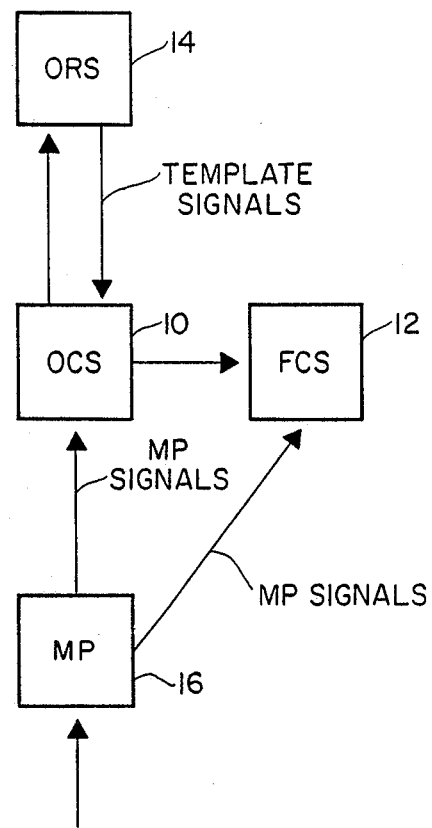
FIG. 1 is a block diagram of a vision system showing the Boundary Contour System of the invention in the context thereof.

Referring now to FIG. 1, the Boundary Contour System of the invention will be described in the context of an overall vision system. As may be seen in the block diagram of FIG. 1, two parallel systems are required within a vision system to deal with paradoxical experimental data concerning brightness, color, and form perception. These two systems, the Boundary Contour System 10 (BC system) and the Feature Contour System 12 (FC system) extract, from image pixel information, two different types of contour-sensitive information—called BC signals and FC signals—at an early processing stage.

In FIG. 1, monocular preprocessed pixel signals MP, representing an arbitrary image, are coupled from an image processor labelled 16 to both the BC System 10 and the FC System 12. The function of BC System 10 is to preattentively, [i.e., without reference to memory, templates, internal stored expectancies, or knowledge, about the image supplied from any non-image source], generate coherent boundary contour signals from these MP signals.

These boundary signals are coupled to both the FC System 12 and an object Recognition System (ORS) 14. The ORS, in turn, rapidly sends top-down learned template signals to the BC System. These template signals modify the preattentively completed boundary structures using learned information. The BC System 10 passes these modifications along to the FC System 12. The signals from the BC System 10 organize the FC System 12 into perceptual regions wherein filling-in of visible brightnesses and colors can occur. This filling-in process is activated by signals from the MP stage 16. The ORS is separately described in co-pending U.S. application, Ser. No. 802,576, previously referenced and continuations-in-part thereof, and the FCS is described in Cohen, M. A. and Grossberg, S. (1984a) "Neural Dynamics of Brightness and Perception: Features, Boundaries, Diffusion, and Resonance", *Perception and Psychophysics* 36, 428–456 and Cohen, M. A. and Grossberg, S. (1984b), "Some Global Properties of Binocular Resonances: Disparity Matching, Filling-In, and Feature Ground Syntheses" In P. Dodwell and T. Caelli (eds.) *Figural Synthesis,* Hillsdale, NJ: Erlbaum., incorporated herein by reference.

2. The Boundary Contours: Real and Illusory

We have found that percepts of "illusory contours"—or contour percepts that do not correspond to one-dimensional luminance differences in a scenic image—and percepts of "real contours" are both synthesized by the same mechanisms. This clarifies why, despite the visual system's manifestly adaptive design, illusory contours are so abundant in visual percepts. This also suggests how illusory contours, that are at best marginally visible, can have powerful effects on perceptual grouping and object recognition processes.

It is helpful to first contrast the noisy visual signals that reach the retina with the coherence of conscious visual percepts. In humans, for example, light passes through a thicket of retinal veins before it reaches retinal photoreceptors. The percepts of human observers are fortunately not distorted by their retinal veins during normal vision. This is due, in part, to the action of mechanisms that attenuate the perception of images that are stabilized, with respect to the retina, as the eye jiggles in its orbit with respect to the outside world. Suppressing the percept of the stabilized veins does not, in itself, complete the percept of retinal images that are occluded and segmented by the veins. Boundaries need to be completed and colors and brightnesses filled in to compensate for the image degradation that is caused by the retinal veins. A similar discussion follows from a consideration of why human observers do not typically notice their blind spots.

Observers are not able to distinguish which parts of such a completed percept are derived directly from retinal signals and which parts are due to boundary completion and featural filling-in. The completed and filled-in percepts are called, in the usual jargon, "illusory" figures. These examples suggest that both "real" and "illusory" figures are generated by the same perceptual mechanisms, and suggest why "illusory" figures are so important in perceptual grouping processes. Once this is understood, the need for a perceptual theory that treats "real" and "illusory" percepts on an equal footing, may be appreciated.

A central issue in such a theory concerns whether boundary completion and featural filling-in are the same or distinct process. By characterizing the different processing rules that they obey, we have found that these processes are indeed different.

The brain extracts two different types of contour information from scenic images. Feature contours, including "color edges", give rise to the signals that generate visible brightness and color percepts at a later processing stage. Feature contours encode this information as a contour-sensitive process in order to discount the illuminant. That is, the best measure of the relative spectral reflectance of two adjacent, co-planar patches of a surface (e.g., a red spot on a blue background) is obtained by computing color edges. Illuminant differences can accumulate if over large regions of homogeneous reflectance, but are unlikely to occur precisely at reflectance edges. Boundary contours are extracted in order to define the perceptual boundaries, groupings, or forms within which featural estimates derived from the feature contours can fill in at a later processing stage.

The process of boundary completion whereby a boundary contour is synthesized between inducing stimuli is indifferent to direction of contrast. The boundary completion process is, however, sensitive to the orientation and amount of contrast of the inducing stimuli.

The feature contours extracted from a scene are, on the other hand, exquisitely sensitive to direction of contrast. Were this not the case, one could never tell the difference between a dark-light and a light-dark percept.

Figure 2:
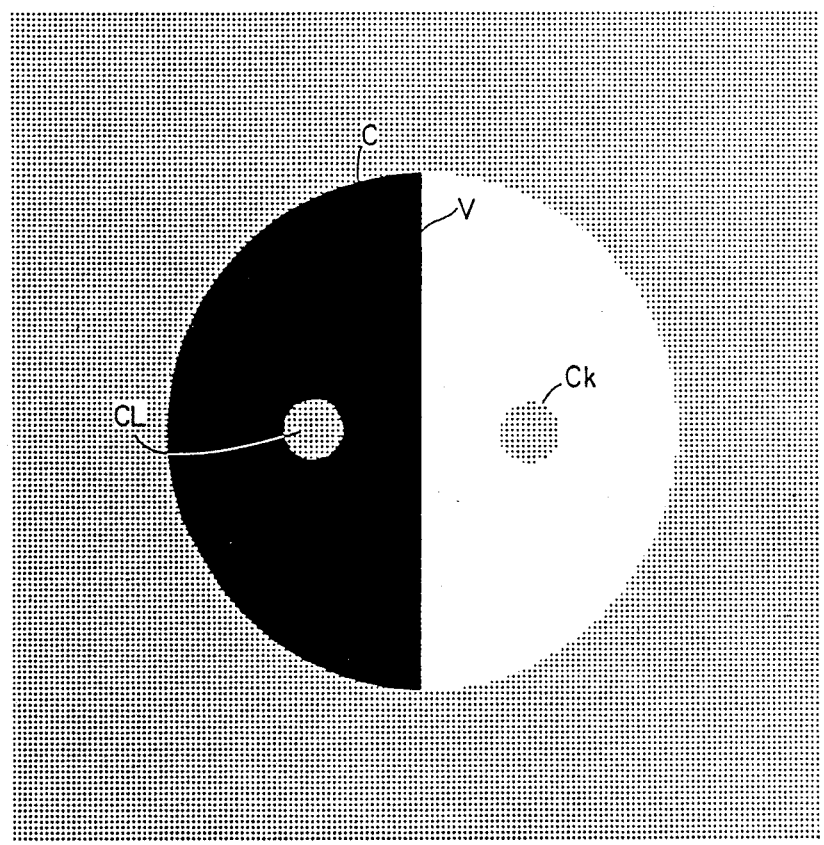
Figure 3:
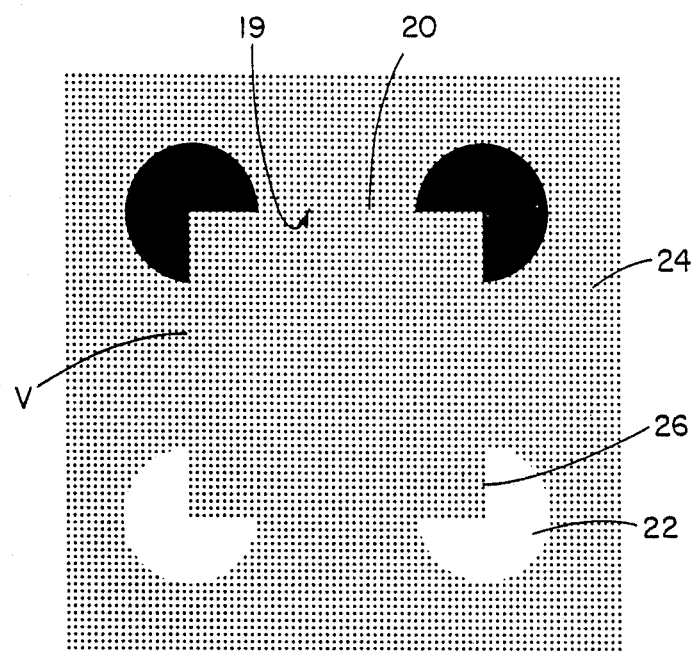
FIG. 3 is a reverse-contrast Kanisza illusory square.

Another difference between BC and FC rules can be inferred from a comparison between FIGS. 2 and 3. Consider first, the image schematized in FIG. 2. After the edges of the large circle C and the vertical line V are stabilized on the retina, the red color (dots) outside the large circle fills in the black and white hemidisks, except within the small red circles CL and CR, whose edges are not stabilized (Yarbus, 1967). The red inside the left circle CL looks brighter and the red inside the right circle CR looks darker than the uniform red that envelopes the remainder of the percept.

In FIG. 3, a boundary forms inward in an oriented way between a pair of inducing scenic edges. FIG. 3 shows a Kanisza illusory square 29 induced by two black Pac-Man figures 20 and two white Pac-Man figures 22 on a gray background 24. In FIG. 2, featural filling-in is due to an outward and unoriented spreading of featural quality from individual FC signals that continues until the spreading signals either hit a boundary contour or are attenuated by their own spatial spread. On the other hand, in FIG. 3, a vertical boundary V connects a pair of vertical scenic edges with opposite direction of contrast. The black Pac-Man figure forms a dark-light vertical edge, with respect to the gray background. The white Pac-Man forms a light-dark vertical edge, with respect to the gray background. The process of boundary completion, whereby a boundary contour is synthesized between these inducing stimuli, is thus indifferent to direction of contrast. However, the boundary completion process is sensitive to the orientation and amount of contrast of inducing stimuli.

Figure 4:
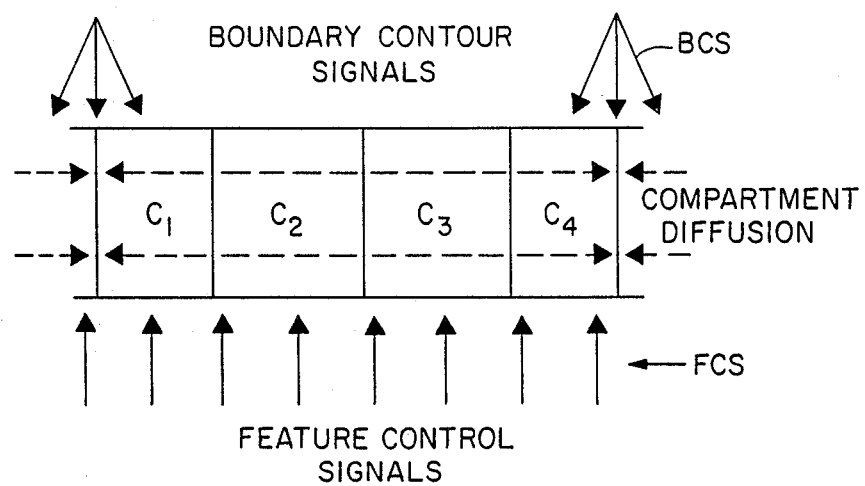
FIG. 4 is a schematic illustrating differences between boundary contour rules and feature contour rules.

The foregoing relationship is illustrated in FIG. 4, which shows a monocular brightness and color stage domain within the vision system. Monocular feature contour signals (FCS) activate cell compartments C1–C4 which permit rapid lateral diffusion of activity, or potential, across their compartment boundaries, except at those compartment boundaries which receive boundary contour signals (BCS) from the BC System. Consequently, the FCS signals are smoothed except at boundaries that are completed within the BC System stage.

Before proceeding with the detailed description of the BC System, certain crucial points of the system of the invention are itemized below:

a. Boundaries may emerge corresponding to image regions between which no contrast differences whatsoever exist.

b. The BC System is sensitive to statistical differences in the distribution of scenic elements, not merely to individual image contrasts.

In particular, it should be noted that the oriented receptive fields, or masks, that initiate boundary processing are not edge detectors; rather, they are local contrast detectors which can respond to statistical differences in the spatial distribution of image contrasts, including, but not restricted to, edges. These receptive fields are organized into multiple subsystems, such that the oriented fields within each subsystem are sensitive to oriented contrasts over spatial domains of different sizes. These subsystems can therefore respond differently to spatial frequency information within the scenic image. Since all these oriented receptive fields are also sensitive to amount of contrast, the BC System registers statistical differences in luminance, orientation, and spatial frequency, even at its earliest stages of processing.

Later stages of the BC System processing are also sensitive to these factors, but in a different way. Their inputs from earlier stages are already sensitive to these factors. They then actively transform these inputs, using competitive-cooperative feedback interactions. The BC System may thereby process statistical differences in luminance, orientation, and spatial frequency within a scenic image in multiple ways.

3. Boundary Contour Systems Stages

Figure 5:
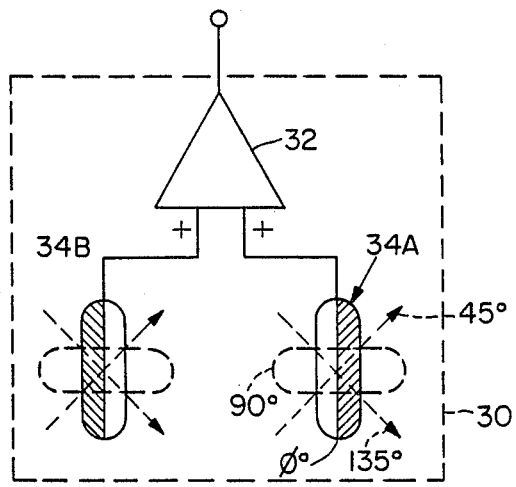
FIG. 5 is a schematic illustrating the combination of families of subsets of OC filter masks to form a direction of contrast insensitive family of masks 30.
Figure 6:
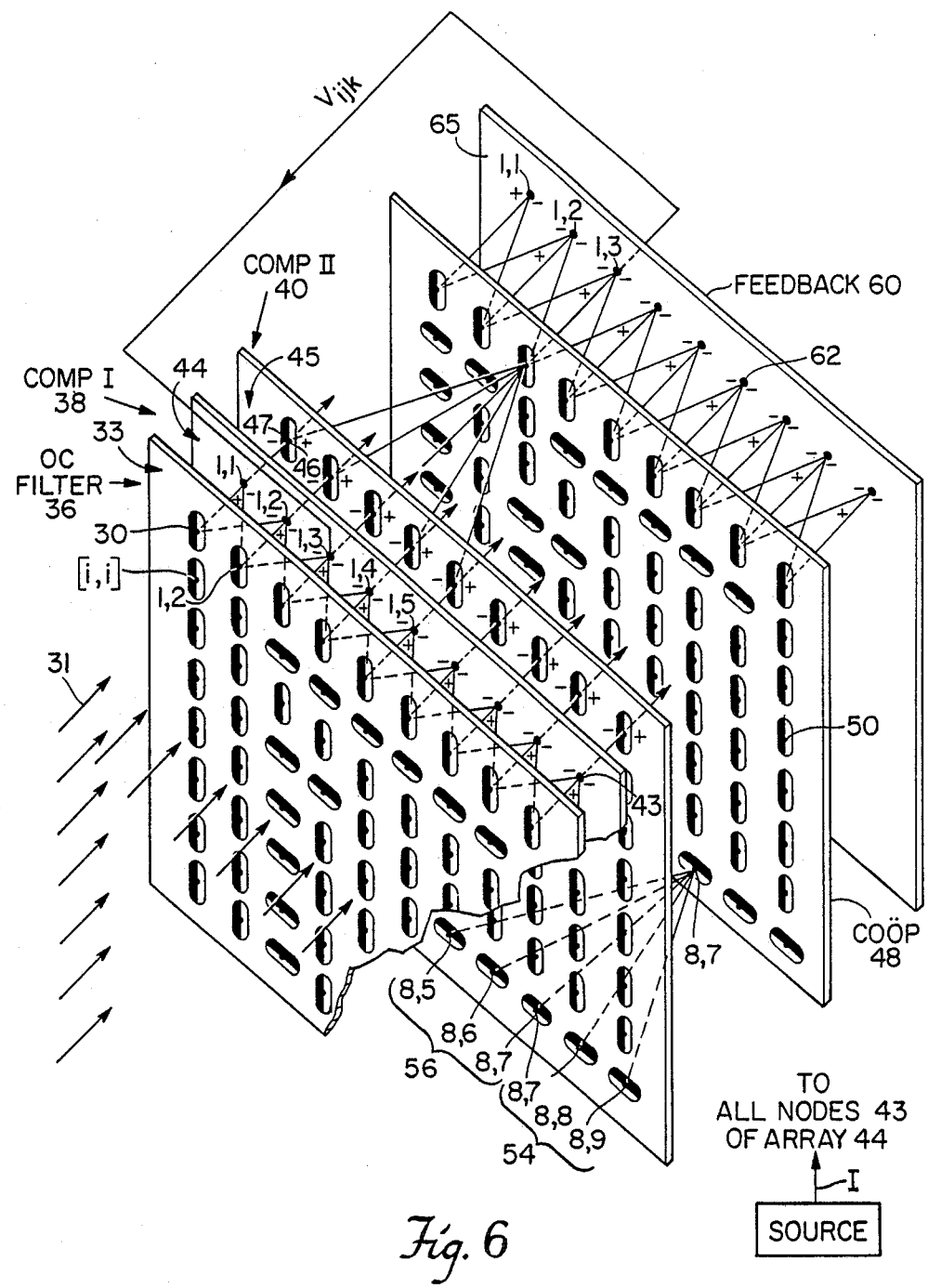
FIG. 6 is a schematicized representation, partially broken away, of the Boundary Contour System of the invention illustrating the several stages of the process.

FIGS. 5 and 6 illustrate, in schematic form, the BC System interactions. These interactions are preferably performed by programming a real-time computer system, in accordance with well-known data processing techniques, using the formulas set forth in Section 4 hereof.

The process whereby boundary contours are formed is initiated by the activation of a family of N oriented masks in an orientation contrast (OC) filter 36. For simplicity, only one such mask 30 is depicted in FIG. 6, it being understood that N such masks reside at each position (i,j) of the mask network. The family of masks, or elongated receptive fields, form an array 33 with N masks at each position (i,j) or orientation (k). The masks are activated by pixel information (arrows 31), preferably in the form of digitized data bits, or pixels, representing an image being processed. For example, the image may comprise an X-Ray picture of a suspected tumor site.

Each oriented mask is a cell, or cell population, that is selectively responsive to oriented scenic-contrast differences. In particular, each mask is sensitive to image edges that activate a prescribed small region of the image and whose orientations lie within a prescribed band of orientations with respect to the image.

In FIG. 5, the details of two subsets of an N family of masks 34A and 34B is shown wherein, in this simple example, N=4. One mask labelled "$\phi$" is shown in solid with vertical orientation. Another is shown in phantom with horizontal orientation and is labelled 90°. A third, with 45° orientation, is represented by the arrow labelled 45° and the fourth with 135° orientation is labelled 135°.

A single set of such oriented masks 34A would be sensitive not only to the position, orientation, and amount of contrast of the region of the image sensed by the mask, but also to the direction of contrast at an edge of a visual scene. To eliminate direction of contrast sensitivity, as shown in FIG. 5, two subsets of masks 34A and 34B are provided at each position and orientation (i,j,k). One subset 34A responds only to light-to-dark contrasts, and the other subset 34B responds to dark-to-light contrasts. [Note: Such oriented masks do not, however, respond only to scenic edges. They can also respond to any pixel image that generates a sufficiently large net contrast with the correct position, orientation, and direction of contrast within their receptive fields.]

Each N pair of oriented masks 34A and 34B, that are sensitive to similar positions and orientations but to opposite directions of contrast, are summed in summer 32 to form the family of masks at each position (i,j) of OC Filter 36.

A row L by column M array of mask families (only one each mask 30 from each family being shown at each position i,j of filter 36) is shown in FIG. 6 to form an OC Filter stage, wherein L=8 and M=9. The output signals from this OC filter stage 36 is thus sensitive to position, orientation, and amount of contrast, but is insensitive to direction of contrast. A vertical boundary contour can thus be activated by either a close-to-vertical light-dark edge or close-to-vertical dark-light edge at a fixed scenic position.

The outputs from these mask families 30 activate the nodes 43 of the first stage 38 of two successive stages of short-range competition, labelled COMPI 38 and COMPII 40. The first competitive stage 38 comprises an array 44 of L by M network nodes 43 to which the mask signals are coupled. Thus, a one-to-one correspondence exists between the mask nodes in OC filter 36 and the network nodes 43 of array 44. A mask 30 of a given orientation (k) excites the like-oriented cells at its nodal position (i,j) in array 44 and inhibits the like-oriented cells at nearby positions. This is illustrated in FIG. 6 by the + sign on lines running from each mask cell to its corresponding node 43 on the network array 44 and the − sign on lines running to adjacent nodes. [Note: For simplicity, competition is only shown between cells at adjacent row positions, but adjacent "up-down" column competition is contemplated, as well, and more than just adjacent cell competition, for example, diagonal, as well. Also, the term "excite" and "inhibit" are meant to include more generally exerting an excitory or inhibitory effect.] Thus, an "on-center-off-surround" interaction occurs between signals emanating from neighboring like-oriented cells of the OC filter and going to like-oriented cells of the first competitive stage COMPI.

The first competitive stage is tonically active as represented by a fixed input I from source S connected to each node 43 of array 44 of COMPI 38.

The mask cell 30 at position i,j=1,2, shown in FIG. 6, is shown with an oriention k=$\phi$ or vertical orientation. This cell tends to excite a cell with vertical orientation (not shown) at node 1,2 of array 44 and inhibits cells (not shown) at nodes 1,1 and 1,3 of array 44.

The input signals to the second competitive stage 40 are the output signals from the cells at the nodes of the first competitive stage 38. At the second competitive stage, competition occurs between different orientations (k) at each position (i,j). Thus, a stage of competition between like orientations at different, but nearby, positions (Stage 38) is followed by a stage of competition between different orientations at the same position (COMPII Stage 40).

In COMPII, cell node signals from the first competitive stage compete that represent other orientational relationships (k) at the same perceptual location (i,j). Thus, a node signal from, say a node at row 1, column 5, i.e., node 1,5 of network 44, indicating, for example, a vertical orientation, tends to excite a vertically oriented node signal at node 1,5 of network 45 and tends to inhibit all other orientations at the same location. In addition, if the output signal at node position (1,5) from the first competitive stage indicates an orientation k; then any output signal of perpendicular orientation K, from another mask signal at position 1,5 which is orthogonal to k, tends to be inhibited at the 1,5 node of the second stage 40. Also, if a given orientation K tends to be inhibited, the orthogonal or perpendicular orientation k also tends to be disinhibited. Note that the phrases "tends to be inhibited" or "tends to be disinhibited" connote that the influence of one cell at one position may be overruled by signals from other cells.

The nodes 47 of the second competitive stage may thus be seen to form a dipole field of on-cells (+) and off-cells (−) (not shown). Inputs from the first competitive stage activate the on-cells of this dipole field. Inhibition of the horizontal on-cells excites the horizontal off-cells via disinhibition.

The excited vertically oriented on-cells in COMPII send excitatory inputs to the receptive fields of vertically oriented cooperative cells located at the nodes of the cooperative stage 48, whereas the excited horizontally oriented off-cells send inhibitory inputs to the receptive fields of horizontally oriented cooperative cells.

Excitation of on-cells generates excitatory inputs to like-oriented cooperative receptive fields, whereas excitation of the off-cells generates inhibitory inputs to like-oriented cooperative receptive fields.

A normalization process occurs at the second competitive stage which insures that the total source of activity resulting from all orientations for a given position (i,j) is bounded.

The value of the output of the mask node signals from the second competitive network nodes is therefore proportional to the ratio of the activated orientation with respect to the sum of all of the other orientations at that location.

The outputs from the dipole field nodes 47 input to a spatially long-range cooperative stage 48, i.e., a boundary completion process.

The cooperative stage also comprises an array of network nodes corresponding one-to-one with the network nodes of the first or second stage with respect to position (i,j) and orientation (k). The function of the cells 50 of the cooperative stage is to complete boundaries over gaps by creating "oriented edges", or contours, where enough statistical data is generated from the preceding stages to warrant such completion. By oriented edge is meant an activation or pattern among nodes (i,j,k) wherein activity in adjacent nodes is spatially aligned roughly in the orientation k, strongest in those individual nodes, which are themselves tuned to orientation k. In this stage, the overall activity pattern at a set of cells, or nodes, tries to align itself so that its dominant active orientation, k, is consistent with that of proximate and distant neighbor cells. For example, if, on both sides of a cell there are many oriented cells that are aligned, then the cell will increase its activity, or strength of its output signal in such orientation (k), with respect to the same or similarly oriented cells surrounding it. This creates an orientational momentum in a given direction. It is important that the statistical data warranting boundary completion (i.e., orientational momentum) exist on both sides of the cell. The orientational momentum must also align itself with the cell receiving the activity. The cell alignment and the orientations do not have to concur exactly; slight mismatches are allowed. The amount of mismatch is determined by model parameters. The surrounding distance in which a cell "looks" for aligned neighbors is also a model parameter.

The foregoing is accomplished by coupling the orientally encoded signals from each node i,j,k of the second competitive stage to a cooperative stage comprising a third array of network nodes 50. Nodes of the cooperative stage sense long range statistical alignment among the oriented node activities encoded in the set of signals emanating from the second competitive stage. By "long range" is meant that signals from distant nodes up to several times the length of the nodes considered in the short range interactions of the two competitive stages, are included in the process.

A greatly simplified example of the above process is shown in FIG. 6 at the lower right corner of array 45 of COMPII, wherein five horizontally aligned cells 46 are shown at row and column positions 8,5; 8,6; 8,7; 8,8; and 8,9. A set of cells 56 and 54 to the left and right of the center of the cell at 8,7, form domains encompassing a range of "distant" nodes considered for determining statistical alignment, it being understood that in practice, many more nodes and columnar, diagonally adjacent and more distant nodes would be considered. The signals from the left and right of cell 8,7, within the brackets, having orientation k=90° are all coupled to cell 8,7 in cooperative stage 48. [Note: A similar process occurs for each orientation k of cell 8,7 and also between each set of cells i,j,k in COMPII 40 and COOP 48.]

The major function of the cooperative stage is to complete boundaries over gaps by grouping image regions in accordance with coherence in statistical properties of image contrast distribution. To accomplish this, the following two main factors are considered in statistically weighting the signals from the competitive stage:

(a) the optimum distance between nodes at the second competitive stage for triggering activity at the competitive stage that completes boundaries; and (b) the direction of propagation between the location of the output signals from the second competitive stage and the location of the respective receptor node at the cooperative stage which receives the output signals as its input.

This weighting is accomplished in two separate long range spatial domains (for example, the left domain 56 and right domain 54 in FIG. 6) for each processing node at the cooperative stage. Thus, for example, the horizontally aligned cooperative cell 8,7 computes separate weighted sums for inputs from its left 56 and inputs from its right 54. Again, it should be emphasized that this process occurs simultaneously for each node in COOP 48, vis-a-vis each set of cells in two separate long-range spatial domains around each cell in COMPII 40. Likewise, all nodes of the COOP stage 48, within certain predetermined spatial domains, send orientation signals to other nodes at the COOP 48.

The weighted sums are transformed, or clipped, to insure that the weighted signals from each domain will not exceed a fixed (constant) value. The transformed signals from each side are summed. Summing assures that sufficiently positive input activity has occurred in both spatial domains, simultaneously, to warrant a boundary completion signal to fill in a gap. If the sum exceeds a fixed value, then the cooperative node will provide a feedback signal. (See Discussion of Equations A15-17 following in Section 4.) These feedback signals are sharpened by an on-center off-surround network in the feedback path, similar to the action of the first competitive stage before being passed to the second competitive stage. This is illustrated in FIG. 6 wherein the feedback output signal from node 1,3 is shown coupled to nodes 1,2 and 1,4, as well as corresponding node 1,3 of the feedback stage 60. (Note: Only the first row of nodes of array 65 are shown for simplicity, in FIG. 6. It should be understood that an LXM array is provided, as in previous stages.) Again, as in the first competitive stage, a mask cell 50 of fixed orientation k in cooperative stage 48 tends to excite, as denoted by the plus (+) sign, like oriented cells 62 at its position (i,j) in array 65 of feedback stage 60 and tends to inhibit, as denoted by the minus (−) sign, the like orientated cells at nearby positions. The feedback signals from each feedback node 62 combines with the still present signals present at corresponding nodes 43 at COMPI stage 38 originating from the oriented contrast driven mask of the OC filter and transduced by the first competitive stage. For example, one such feedback signal $V_{ijk}$ [i,j=1,3] is shown coupled back to node 1,3 of array 44. The combination of the feedback signal and mask "signals" thus modify the pattern of activity at the second competitive stage 40, in accordance with the sensed long-range statistical data. This, in turn, causes a revision of the output from the second competitive stage resulting in revised feedback information, until equilibrium is rapidly reached.

4. Boundary Contour System Network Model

A BS System network model is defined in detail below:

A. Oriented Masks

To define a mask, or oriented receptive field, centered at position (i,j) with orientation k, the elongated receptive field of the mask is divided into a left-half $L_{ijk}$ and a right-half $R_{ijk}$. [Note: Upper case un-indexed letters refer to constants.] All the masks sample a field of preprocessed inputs. If $S_{pq}$ equals the preprocessed input to position (p,q) of this field, then the output $J_{ijk}$ from the mask 30 at position (i,j) with orientation k is:

$$J_{ijk} = \frac{[U_{ijk} - \alpha V_{ijk}]^+ + [V_{ijk} - \alpha U_{ijk}]^+}{1 + \beta(U_{ijk} + V_{ijk})} \quad (A1)$$

where $$U_{ijk} = \sum_{(p,q)\in L_{ijk}} S_{pq} \quad (A2)$$

$$V_{ijk} = \sum_{(p,q)\in R_{ijk}} S_{pq}, \quad (A3)$$

and the notation $[P]^+ = \max(p,0)$. The sum of the two terms in the numerator of Equation A1 means that $J_{ijk}$ is sensitive to the orientation and amount of contrast, but not to the direction of contrast, received by $L_{ijk}$ and $R_{ijk}$. The denominator term in Equation A1 enables $J_{ijk}$ to compute a ratio scale in the limit where $\beta(U_{ijk}+V_{ijk})$ is much greater than 1.

B. On-Center-Off-Surround Interaction Within Each Orientation (Competition I)

Inputs $J_{ijk}$ with a fixed orientation k activate potentials $W_{ijk}$ at the first competitive stage via "on-center-off-surround interactions": each $J_{ijk}$ excites $W_{ijk}$ and inhibits $W_{pqk}$ if $|p-1|^2 + |q-j|^2$ is sufficiently small. All the potentials $W_{ijk}$ are also excited by the same tonic input I, which supports disinhibitory activations at the next competitive stage. Thus, $$\frac{d}{dt} W_{ijk} = -W_{ijk} + I + f(J_{ijk}) - W_{ijk} \sum_{(p,q)} f(J_{pqk})A_{pqij}, \quad (A4)$$

where $A_{pqij}$ is the inhibitory interaction strength between positions (p,q) and (i,j) and $f(J_{ijk})$ is the input signal generated by $J_{ijk}$.

C. Push-Pull Opponent Processes Between Orientation at Each Position

Perpendicular potentials represented by $W_{ijk}$ and $W_{ijK}$ at the COMPI stage elicit output signals that compete at their target potentials $X_{ijk}$ and $X_{ijK}$, respectively. [Note: The orientation perpendicular to k is denoted by a capital K.] For simplicity, it is assumed that these output signals equal the potentials $W_{ijk}$ and $W_{ijK}$, which are always non-negative. We also assume that $X_{ijk}$ and $X_{ijK}$ respond quickly and linearly to these signals. Thus, $$X_{ijk} = W_{ijk} - W_{ijK} \quad (A6)$$

and $$X_{ijK} = W_{ijK} - W_{ijk}. \quad (A7)$$

D. Normalization at Each Position

We also assume that, as part of this push-pull opponent process, the outputs $Y_{ijk}$ of the second competitive stage 40 (FIG. 6) become normalized. Several ways exist for achieving this property. We have used the following approach:

The potentials $X_{ijk}$ interact when they become positive. Thus we let the output $O_{ijk} = O(X_{ijk})$ from $X_{ijk}$ equal $$O_{ijk} = C[W_{ijk} - W_{ijK}]^+, \quad (A8)$$

where C is a positive constant and $[p]^+ = \max(p,0)$. All these outputs at each position interact via a shunting on-center-off-surround network whose potentials $Y_{ijk}$ satisfy:

$$\frac{d}{dt} Y_{ijk} = -DY_{ijk} + (E - Y_{ijk}) O_{ijk} - Y_{ijk} \sum_{m\neq k} O_{ijm}. \quad (A9)$$

[Note: D expresses the rate of passive (exponential) decay of cell activity.] E expresses the saturation level of $Y_{ijk}$. Any time $Y_{ijk}$ E, the middle term on the right side of Equation A9 is O, driving the activity down.

Each potential $Y_{ijk}$ equilibrates rapidly to its input. Setting:

$$\frac{d}{dt} Y_{ijk} = 0$$

in Equation A9 implies that:

$$Y_{ijk} = \frac{EO_{ijk}}{D + O_{ij}}, \quad (A10)$$

where:

$$O_{ij} = \sum_{m=1}^{n} O_{ijm}. \quad (A11)$$

Thus, if D is small compared with $O_{ij}$, then $$\sum_{m=1}^{n} Y_{ijm} \cong E.$$

E. Opponent Inputs to the Cooperative Stage

The $W_{ijk}$, $X_{ijk}$, and $Y_{ijk}$ potentials are all assumed to be part of the on-cell subfield of a dipole field. [Note: "On" and "off" in a dipole field simply means "mutually antagonistic". Thus, by "on-cell" we mean one that is excited by signals from nodes of the OC filter. A corresponding off-cell would be isolated by those same signals.] If $Y_{ijk}$ is excited, an excitatory signal ($f(H_{ijk})$ is generated at the cooperative stage. When potential $Y_{ijk}$ is excited, the potential $Y_{ijk}$ corresponding to the perpendicular orientation is inhibited. Both of these potentials form part of the on-cell subfield of a dipole field. Inhibition of an on-cell potential $Y_{ijK}$ disinhibits the corresponding off-cell potential $\overline{Y}_{ijK}$, which sends an inhibitory signal $-f(\overline{Y}_{ijk})$ to the cooperative level. The signals $f(Y_{ijk})$ and $-f(\overline{Y}_{ijK})$ thus occur together. In order to instantiate these properties, we made the simplest hypothesis, namely that $$\overline{Y}_{ijK} = Y_{ijk}; \quad (A12)$$

That is, the off-cell response for an orientation K perpendicular to k is the same as the on-cell response for orientation k.

The effect of the on-cell and off-cell dipole fields will be further discussed and illustrated in connection with FIGS. 8A and B and FIGS. 9A and B and Section 5 following.

F. Oriented Cooperation: Statistical Gates

The cooperative potential $Z_{ijk}$ can be supraliminally activated only if both of its cooperative input branches and receive enough net positive excitation from similary aligned competitve potentials. Thus, $$\frac{d}{dt} Z_{ijk} = -Z_{ijk} + g\left(\sum_{(p,q,r)} [f(Y_{pqr}) - f(Y_{pqr})] F_{pqij}^{(r,k)}\right) + \quad (A13)$$

$$g\left(\sum_{(p,q,r)} [f(Y_{pqr}) - f(Y_{pqr})^-] G_{pqij}^{(r,k)}\right)$$

In Equation A13, g(s) is a signal function that becomes positive only when s is positive, and has a finite maximum value. A slower-than-linear function, $$g(s) = \frac{H[s]^+}{K + [s]^+} \quad (A14)$$

was used in our simulations. A sum of two sufficiently positive g(s) terms in Equation A13 is needed to activate $Z_{ijk}$ above the firing threshold of its output signal $h(Z_{ijk})$. A threshold-linear signal function, $$h(z) = L[z-M]^+, \quad (A15)$$

was used. Each sum, such as:

$$\sum_{(p,q,r)} f(Y_{pqr}) F_{pqij}^{(r,k)} \quad (A16)$$

and $$\sum_{(p,q,r)} f(Y_{pqr}) G_{pqij}^{(r,k)} \quad (A17)$$

is a spatial cross-correlation that adds up inputs from a strip of nodes with preferred orientation (approximately equal to) k, which lies to one side or the other of position (i,j). The orientations r that contribute to the spatial kernels:

$F_{pqij}^{(r,k)}$ and $G_{pqij}^{(r,k)}$ also approximately equal k. The kernels $F_{pqij}^{(r,k)}$ and $G_{pqij}^{(r,k)}$ are defined by:

$$F_{pqij}^{(r,k)} = [\exp[-2(N_{pqij}P^{-1} - 1)^2] \times \quad (A18)$$

$$[|\cos(Q_{pqij} - r)|]^R [|\cos(Q_{pqij} - k)|^T]^+$$

and $$G_{pqij}^{(r,k)} = [-\exp[-2(N_{pqij}P^{-1} - 1)^2] \times \quad (A19)$$

$$[|\cos(Q_{pqij} - r)|]^R [|\cos(Q_{pqij} - k)|^T]^+,$$

where $$N_{pqij} = \sqrt{(p-i)^2 + (q-j)^2}, \quad (A20)$$

$$Q_{pqij} = \arctan\left(\frac{q-j}{p-i}\right), \quad (A21)$$

and P, R, and T are positive constants. In particular, R and T are odd integers. Kernels F and G differ only by a minus sign under the [. . . ]$^+$ sign. This minus sign determines the polarity of the kernel, namely, whether it collects inputs for $Z_{ijk}$ from one side or the other of position (i,j). The term:

$$\exp\left[-2\left(\frac{N_{pqij}}{P} - 1\right)^2\right]$$

determines the optimal distance P from (i,j) at which each kernel collects its inputs. The kernel decays in a Gaussian fashion as a function of $N_{pqij}/P$, where $N_{pqij}$ in Equation A20 is the distance between (p,q) and (i,j). The cosine terms in Equations A18 and A19 determine the orientational tuning of the kernels. By Equation A21, $Q_{pqij}$ is the direction of position (p,q) with respect to the position of the cooperative cell (i,j) in Equation A13. The term $|\cos(Q_{pqij}-r)|$ in Equations A18 and A19 computes how parallel $Q_{pqij}$ is to the receptive field orientation r at position (p,q). By Equation A21, the term $|\cos(Q_{pqij}-r)|$ is maximal when the orientation r equals the orientation of (p,q) with respect to (i,j). The absolute value sign around this term prevents it from becoming negative. Term $\cos(Q_{pqij}-k)$ in Equations A18 and A19 computes how parallel $Q_{pqig}$ is to the orientation k of the receptive field of the cooperative cell (i,j) in Equation A13. By Equation A21, the term $\cos(Q_{pqij}-k)$ is maximal when the orientation k equals the orientation of (p,q) with respect to (i,j). Positions (p,q) such that $\cos(Q_{pqij}-k)<0$ do not input to $Z_{ijk}$ via kernel F because the $[\ldots]^+$ of a negative number equals zero. On the other hand, such positions (p,q) may input to $Z_{ijk}$ via kernel G due to the extra minus sign in the definition of kernel G. The extra minus sign in Equation A19 flips the preferred axis of orientation of kernel $G_{pqij}^{(r,k)}$ with respect to the kernel $F_{pqij}^{(r,k)}$ in order to define the two input-collecting branches of each cooperative cell. The product terms $[|\cos(Q_{pqji}-r)|]^R[\cos(Q_{pqij}k)]^T$ in Equations A18 and A19 thus determine larger path weights from dipole field on-cells whose positions and orientations are nearly parallel to the preferred orientation k of the cooperative cell (i,j), and larger path weights from dipole-field off-cells whose positions and orientations are nearly perpendicular to the preferred orientation k of the cooperative cell (i,j). The powers R and T determine the sharpness of orientational tuning: Higher powers enforce sharper tuning.

G. On-Center-Off-Surround Feedback Within Each Orientation

We assume that each $Z_{ijk}$ activates a shunting on-center-off-surround interaction within each orientation k. The target potentials $V_{ijk}$ therefore obey an equation of the form .

$$\frac{d}{dt} V_{ijk} = -V_{ijk} + h(Z_{ijk}) - V_{ijk} \sum_{(p,q)} h(Z_{pqk}) W_{pqij}. \quad (A22)$$

The bottom-up transformation $J_{ijk}$—$W_{ijk}$ in Equation A4 is thus similar to the top-down transformation $Z_{ijk}$—$V_{ijk}$ in Equation A22. Functionally, the $Z_{ijk}$—$V_{ijk}$ transformation enables the most favored cooperations to enhance their preferred positions and orientation as they suppress nearby positions with the same orientation. The signals $V_{ijk}$ take effect by inputting to the $W_{ijk}$ opponent process. (See COMPI stage, FIG. 6) Equation A4 is thus changed to:

$$\frac{d}{dt} W_{ijk} = \quad (A23)$$
$$-W_{ijk} + I + f(J_{ijk}) + V_{ijk} - W_{ijk} \sum_{(p,q)} f(J_{pqk}) A_{pqij}.$$

At equilibrium, the computational logic of the BC System is determined, up to parameter choices, by the equations:

$$J_{ijk} = \frac{[U_{ijk} - \alpha V_{ijk}]^+ + [V_{ijk} - \alpha U_{ijk}]^+}{1 + \beta(U_{ijk} + V_{ijk})}, \quad (A1)$$

$$W_{ijk} = \frac{I + BJ_{ijk} + V_{ijk}}{1 + B \sum_{(p,q)} J_{pqk} A_{pqij}}, \quad (A24)$$

$$O_{ijk} = C[W_{ijk} - W_{ijk}]^+, \quad (A8)$$

$$Y_{ijk} = \frac{EO_{ijk}}{D + O_{ij}}, \quad (A10)$$

$$Z_{ijk} = g\left(\sum_{(p,q,r)} [f(Y_{pqr}) - f(Y_{pqR})]F_{pqij}^{(R,k)}\right) + \quad (A25)$$
$$g\left(\sum_{(p,q,r)} [f(Y_{pqr}) - f(Y_{pqr})]G_{pqij}^{(r,k)}\right),$$

and $$V_{ijk} = \frac{h(Z_{ijk})}{1 + \sum_{(p,q)} h(Z_{pqk}) W_{pqij}} \quad (A26)$$

Wherever possible, simple spatial kernels were used. For example, the kernels $W_{pqij}$ in Equation A22 and $A_{pqij}$ in Equation A23 were both chosen to be constant within a circular receptive field:

$$A_{pqij} = \begin{cases} A & \text{if } (p-i)^2 + (q-j)^2 \leq A_o \\ 0 & \text{otherwise} \end{cases} \quad (A27)$$

and $$W_{pqij} = \begin{cases} W & \text{if } (p-i)^2 + (q-j)^2 \leq W_o \\ 0 & \text{otherwise} \end{cases} \quad (A28)$$

5. Cooperative Receptive Field for Cooperative Stage 48

Two types of parameters must be specified to characterize receptive fields: macroscale parameters, which determine the gross shape of each receptive field, and microscale parameters, which determine how effectively a dipole-field input of prescribed orientation can excite or inhibit a cooperative receptive field. FIGS. 8A, B, and 9A, B describes a computer simulation of the cooperative receptive field. Note: In FIGS. 8A, B, and 9A, B, line lengths are proportional to the strengths of weights for signals from a horizontally tuned competitive cell to cooperative cells of various orientations at nearby positions. In other words, the pattern in FIGS. 8A, B and 9A, B represents a distribution which is modulated by the actual level of cell activities. The orientations are denoted by the line orientations. As shown in the enlarged view of FIG. 7, four such orientations are depicted at 0° (vertical) 45°, 90° (horizontal) and 135°. Note also that the horizontal orientation is strongest in FIG. 7 and the vertical is weakest. Thus, in FIG. 8B, strong signals are sent to horizontal cooperative cells 5 units to the left or the right of the competitive cell (center circle), but signal strength drops off with distance and change of orientation. FIG. 8A shows the dual perspective of weights assigned to incoming signals by the receptive field of a horizontal cooperative cell. (Note that only excitatory signal strengths are indicated in this figure.)

Figure 9A:
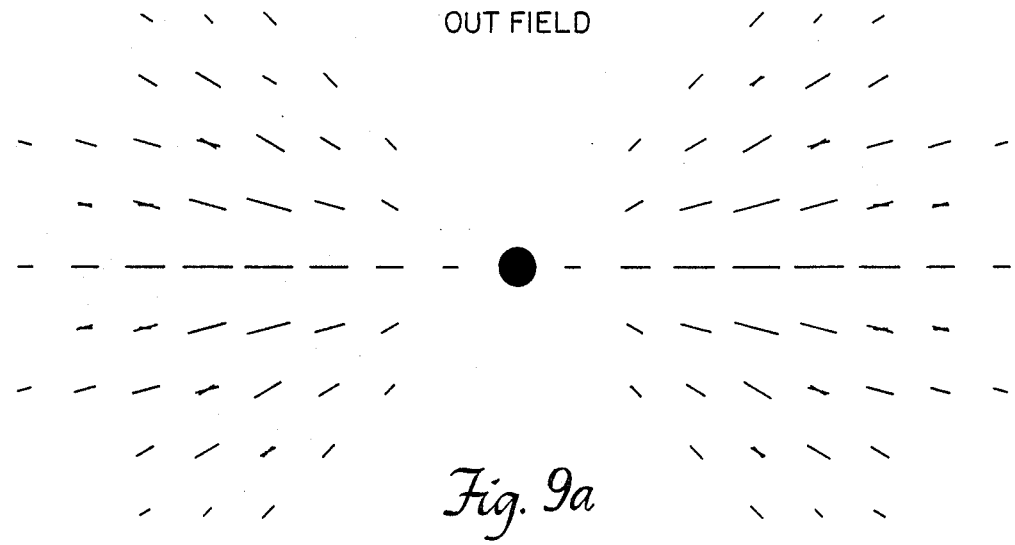
FIGS. 9A and 9B, respectively, illustrate more extreme cooperative out-fields (9A) and in-fields (9B) than in FIGS. 8A and 8B.
Figure 9B:
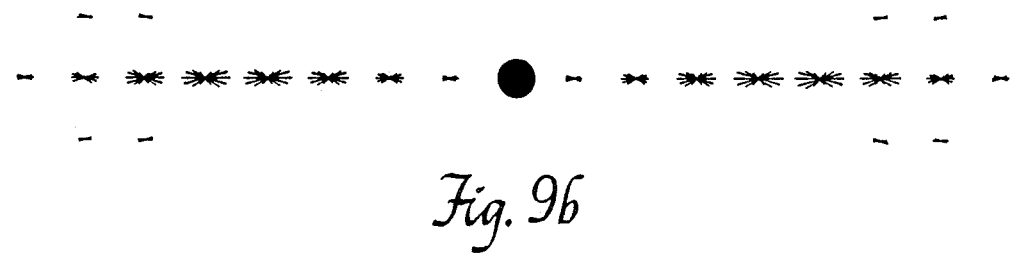

In FIG. 9, an extreme cooperative in-field FIG. 9B and out-field FIG. 9A is shown. This figure employs more extreme parameter choices than were used in the simulations of FIG. 8. Greater orientational uncertainty at one location of the in-field corresponds to greater positional uncertainty in the out-field, thereby illustrating the duality between in-field and out-field.

The cooperative in-field, or receptive field, in FIG. 9 describes the path weights from all dipole-field on-cells with the depicted positions and preferred orientations to a single cooperative cell with a horizontally oriented receptive field. The length of each line is thus proportional to the sensitivity of the receptive field to inputs received from cells coding the depicted positions and orientations. The cell in the field of FIG. 8 is most sensitive to horizontally oriented inputs that fall along a horizontal axis passing through the cell.

6. Perceptual Grouping

In this section, computer simulations are summarized in connection with FIGS. 10-17, to illustrate the BC System's ability to generate perceptual groupings. In FIGS. 10-17, the length of each line segment is proportional to the activation of a network node responsive to one of 12 possible orientations. The dots indicate the positions of inactive cells. In FIGS. 10-17, part (a) displays idealized signals from masks of the OC filter, which sense the amount of contrast at a given orientation of visual input. Each grouping of three columns and six rows of signals are called a Line because it is a caricature of how a denser array of masks would respond to an actual image line. Parts (b)-(d) show equilibrium activities of oriented cells at the competitive and cooperative layers. A comparison of (a) and (c) indicates the major groupings sensed by the network. Only the vertical alignment of the two left and two right clusters or Lines is registered.

Numerical parameters were held fixed for all of the simulations; only the input patterns were varied. As the input patterns were moved about, the BC System sensed relationships among the inducing elements and generated emergent boundary groupings among them. In all of the simulations, the input patterns are defined to be the output patterns of the oriented receptive fields, as in FIG. 10a, since the primary objective was to study the cooperative-competitive (CC) feedback exchange. This step reduced the computer time needed to generate the simulations. Preferably, the BC System will utilize parallel hardware, rather than by simulation on a traditional computer, so that it will run in real-time.

In FIGS. 10-17, network activities are displayed after the CC feedback loop converges to an equilibrium state. These simulations used only a single cooperative bandwidth. They thus illustrate how well the BC System can segment images using a single "spatial frequency" scale. Multiple scales are, however, needed to generate three-dimensional form percepts.

Figure 10A:
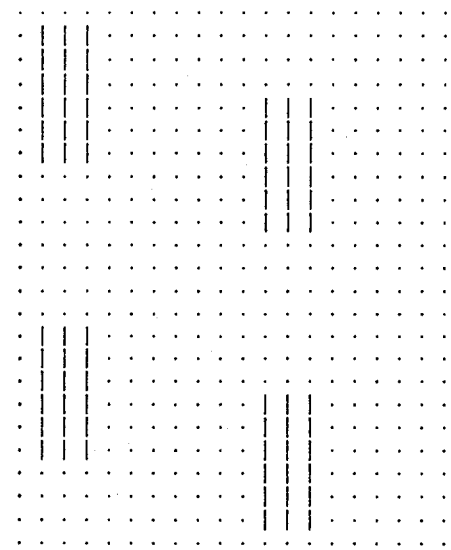
FIGS. 10–17 illustrate computer simulations of the Boundary Contour System processes underlying textural grouping.
Figure 10B:
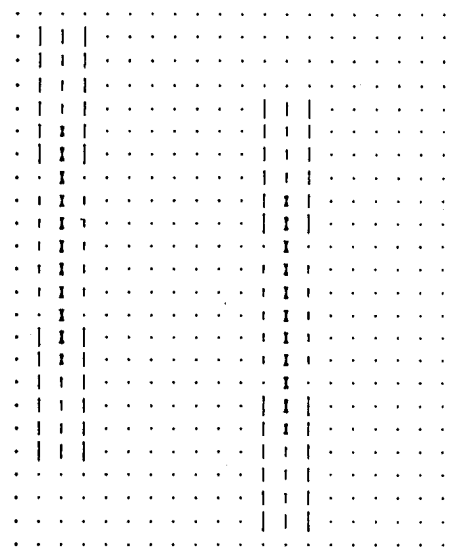
Figure 10C:
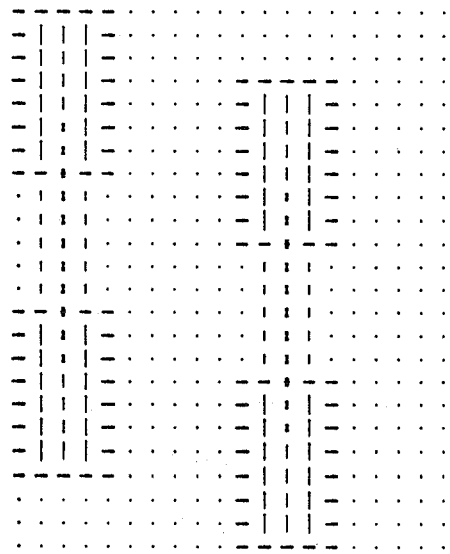
Figure 10D:
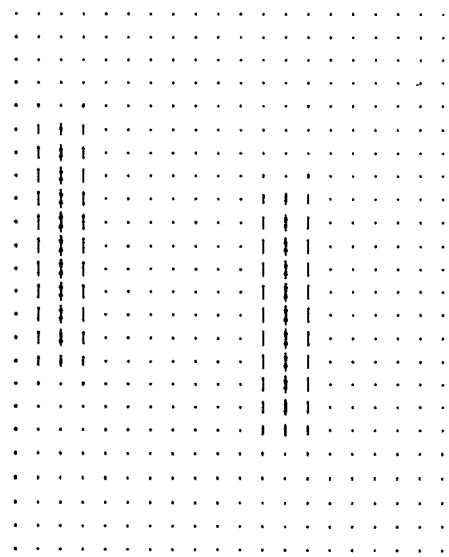

FIG. 10a depicts an array of four vertically oriented input clusters. In FIGS. 10b, 10c and 10d, the equilibrium activities of the cells at three successive CC stages are displayed: the first competitive stage b, the second competitive stage c, and the cooperative stage d. The length of an oriented line at each position is proportional to the equilibrium activity of a cell whose receptive field is centered at that position with the prescribed orientation. Note that, as in the enlarged view of FIG. 10, four orientations are depicted, the focus is upon the activity pattern within the y field, or second competitive stage of each simulation (FIG. 18c). This is the final competitive stage that inputs to the cooperative stage d. The w-field (first competitive stage) and z-field (cooperative stage) activity patterns are also displayed to enable a better intuition after considering the definitions of these fields as provided in the preceding description.

The input pattern in FIG. 10a possesses a manifest vertical symmetry: Pairs of vertical Lines are collinear in the vertical direction, whereas they are spatially out-of-phase in the horizontal direction. The BC System senses this vertical symmetry, and generates emergent vertical lines in FIG. 10c, in addition to horizontal end cuts at the ends of each Line.

Figure 11A:
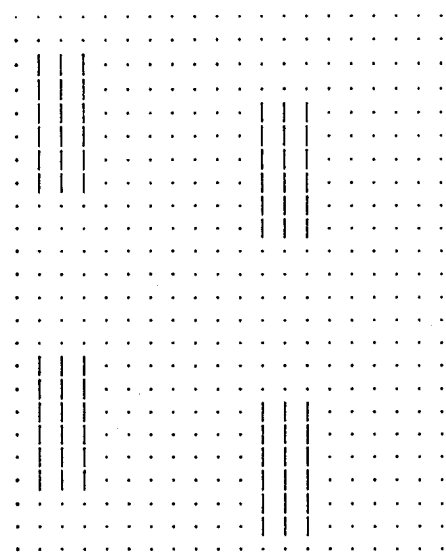
Figure 11B:
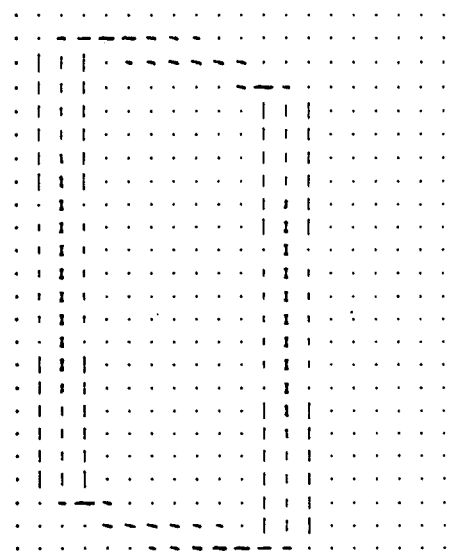
Figure 11C:
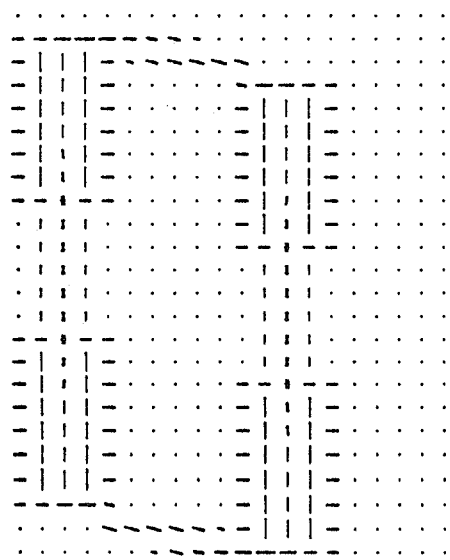
Figure 11D:
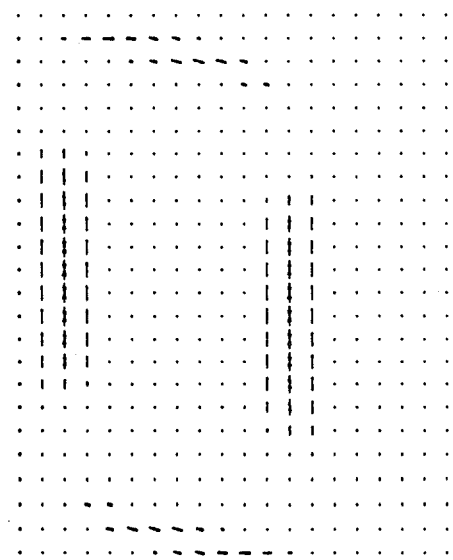

In FIG. 11a, the input pattern shown in FIG. 10a has been altered, so that the first column of vertical Lines is moved downward relative to the second column of vertical Lines. FIG. 11c shows that the BC System begins to sense the horizontal symmetry within the input configuration. In addition to the emergent vertical grouping and horizontal end cuts, like those of FIG. 10c, an approximately horizontal grouping has appeared.

In FIG. 12, the input Lines are moved so that pairs of Lines are collinear in the vertical direction and their Line ends are lined up in the horizontal direction. Now both vertical and horizontal groupings are generated in FIG. 12c.

Figure 12A:
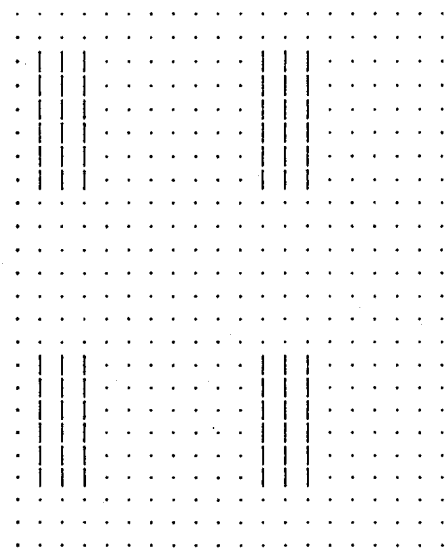
Figure 12B:
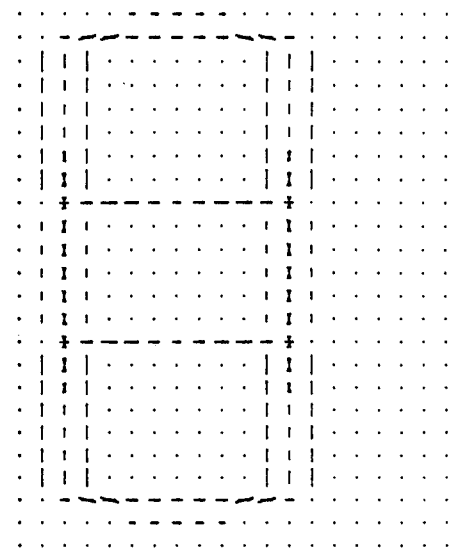
Figure 12C:
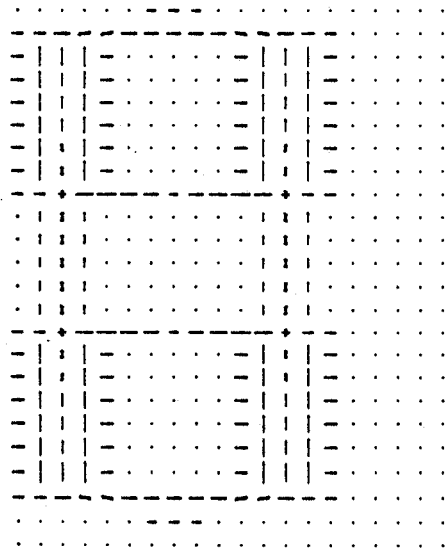
Figure 12D:
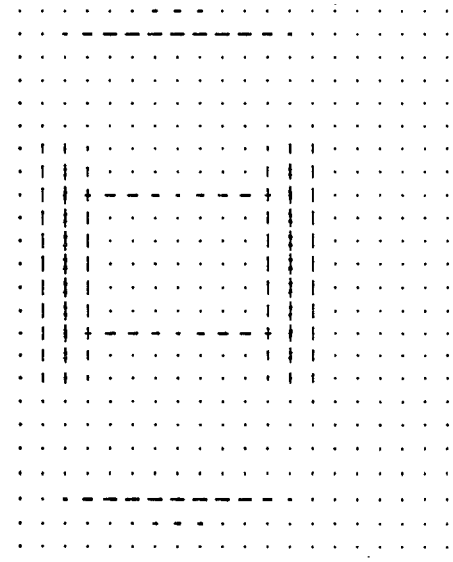
Figure 13A:
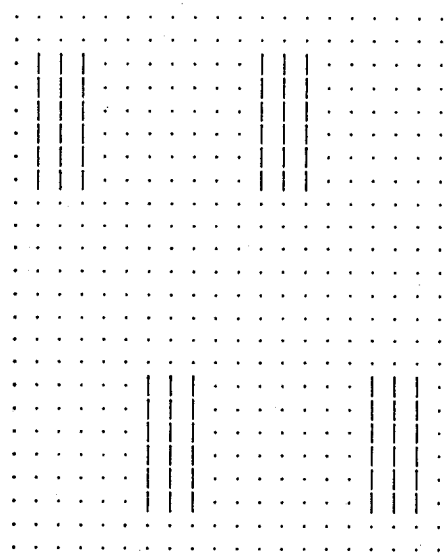
Figure 13B:
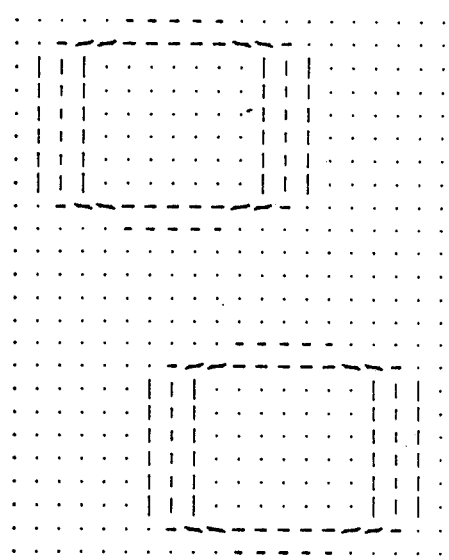
Figure 13C:
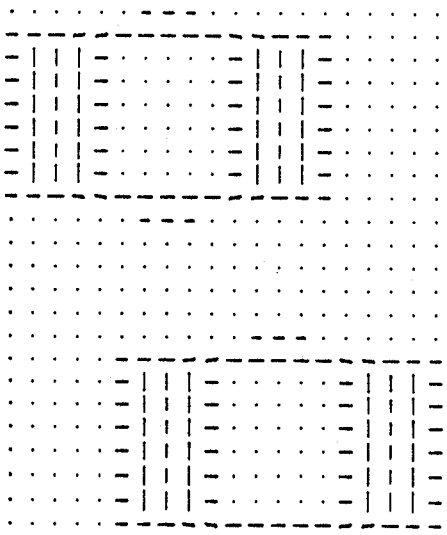
Figure 13D:
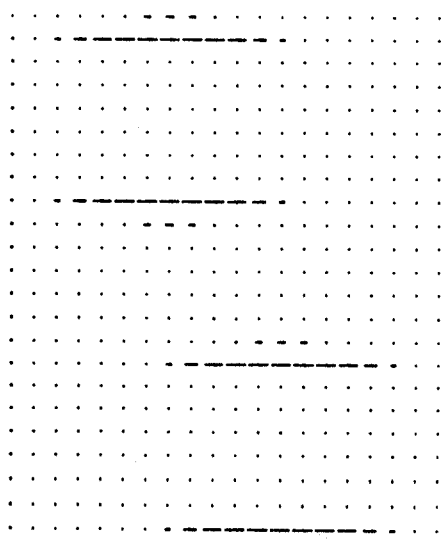
Figure 14A:
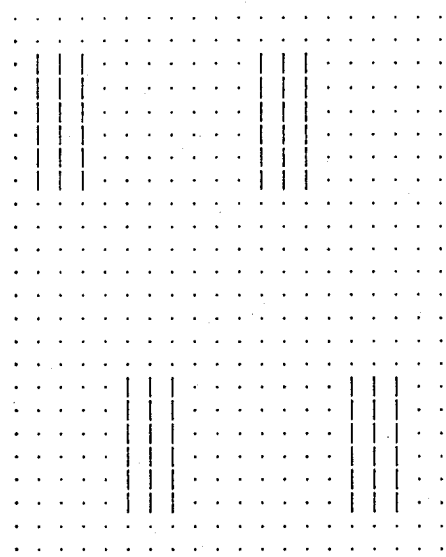
Figure 14B:
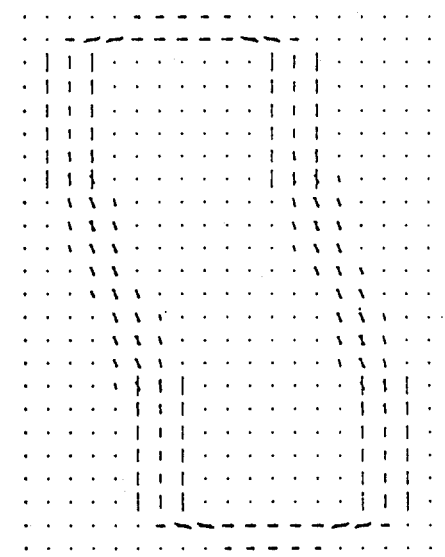
Figure 14C:
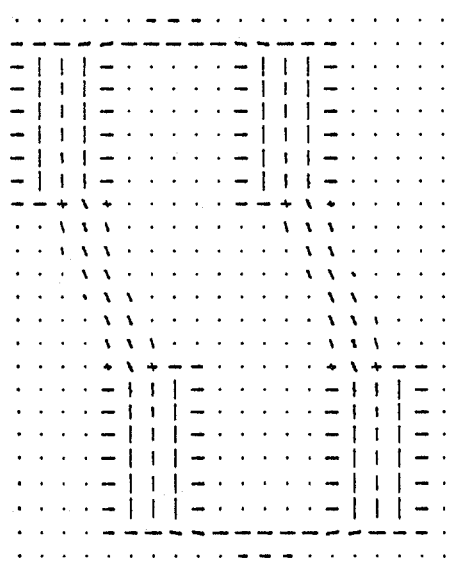
Figure 14D:
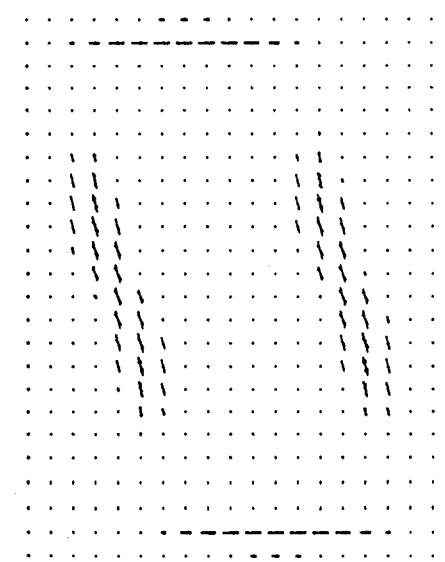

In FIG. 13a, the input Lines are shifted so that they become non-collinear in a vertical direction, but pairs of their Line ends remain aligned. The vertical symmetry of FIG. 12a is hereby broken. Thus, in FIG. 13c, the BC System groups the horizontal Line ends, but not the vertical Lines.

FIG. 14 depicts a more demanding phenomenon: the emergence of diagonal groupings where no diagonals whatsoever exist in the input pattern. FIG. 14a is generated by bringing the two horizontal rows of vertical Lines closer together until their ends lie within the spatial bandwidth of the cooperative interaction. FIG. 14c shows that the BC System senses diagonal groupings of the Lines. It is remarkable that these diagonal groupings emerge both on a microscopic scale and a macroscopic scale. Thus, diagonally oriented receptive fields are activated in the emergent boundaries, and these activations, as a whole, group into diagonal bands.

Figure 15A:
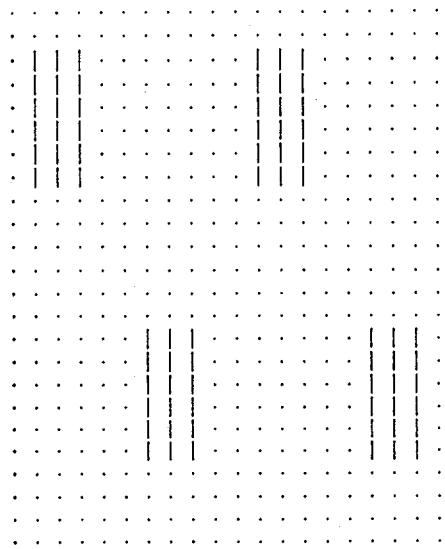
Figure 15B:
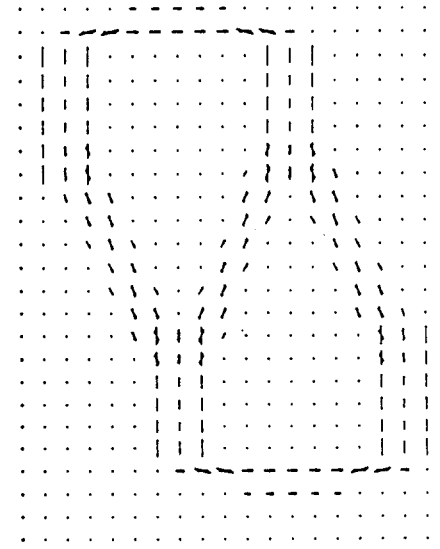
Figure 15C:
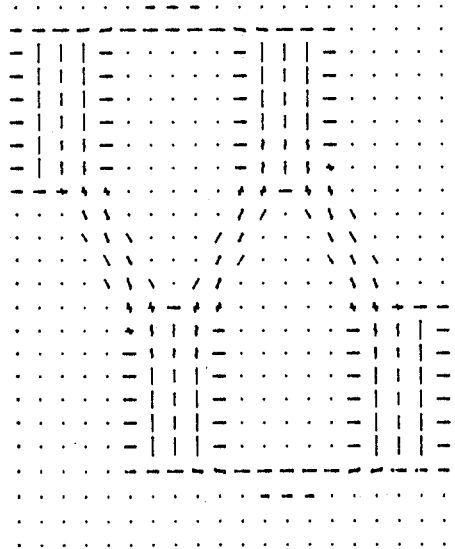
Figure 15D:
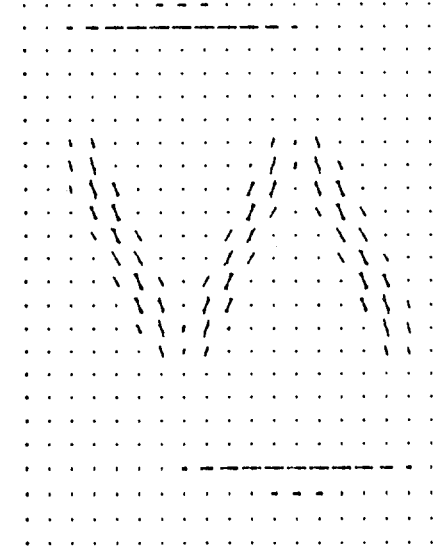

In FIG. 15c, another shift of the inputs induces internal diagonal bands while enabling the exterior grouping into horizontal and diagonal boundaries to persist.

Figure 16A:
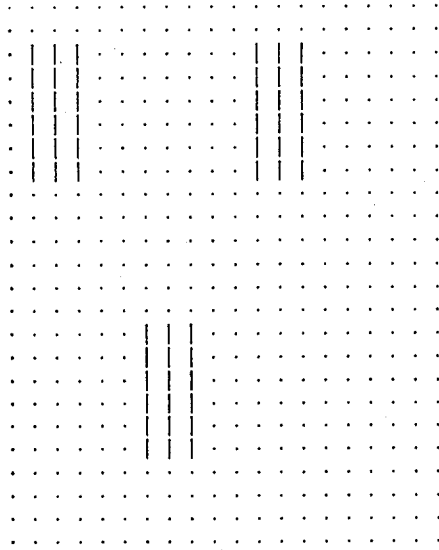
Figure 16B:
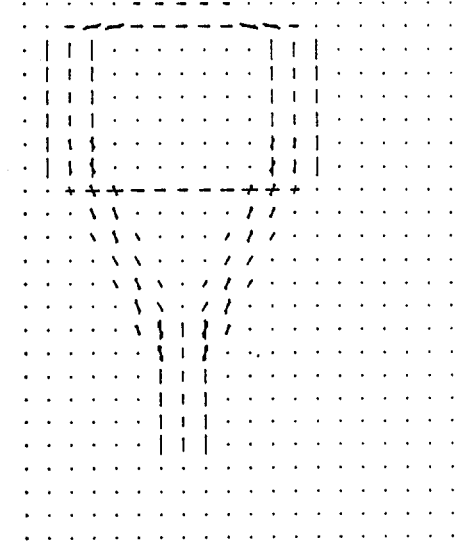
Figure 16C:
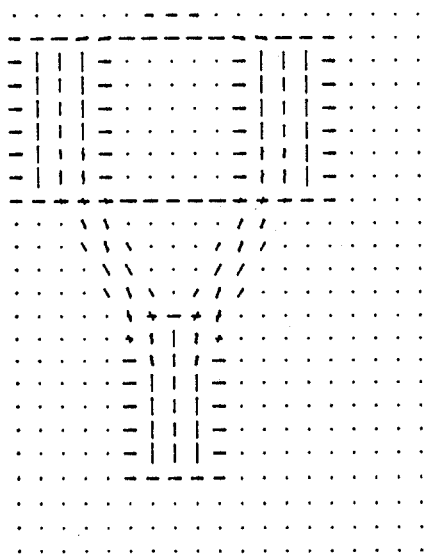
Figure 16D:
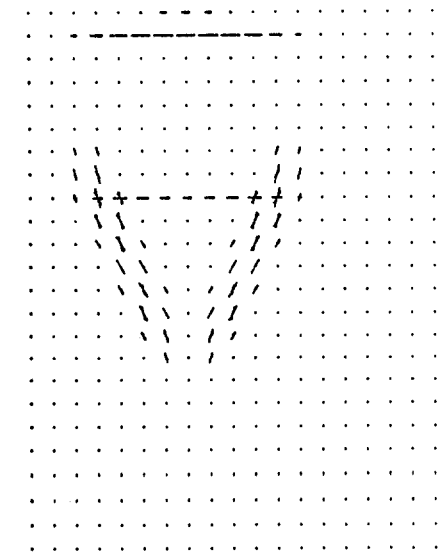
Figure 17A:
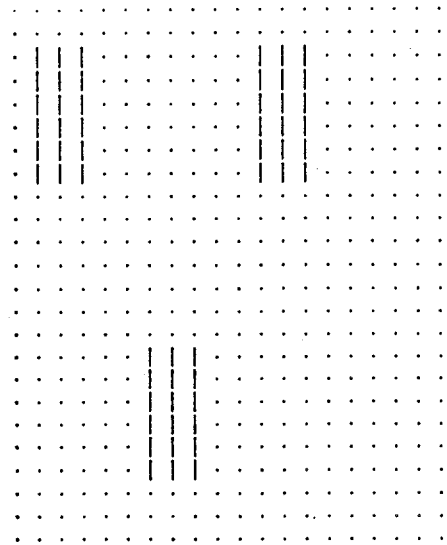
Figure 17B:
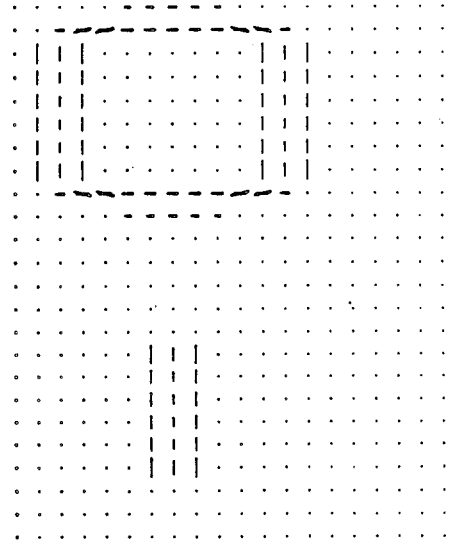
Figure 17C:
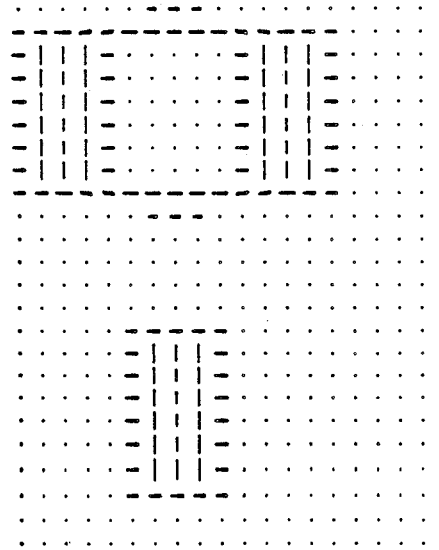
Figure 17D:
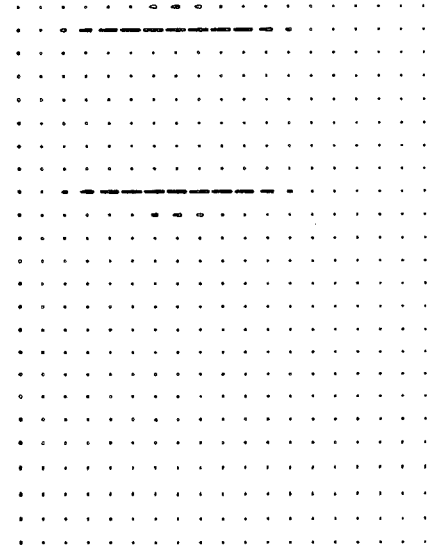

In FIG. 15a, one of the vertical Lines is removed. The BC System now senses the remaining horizontal and diagonal symmetries (FIG. 16c). In FIG. 17a, the lower Line is moved further away from the upper pair of lines until the cooperation can no longer support the diagonal groupings. The diagonal groupings break apart, leaving the remaining horizontal groupings intact (FIG. 17c).

These figures illustrate the fact that the BC System behaves like an on-line statistical decision mechanism in response to its input patterns. The BC System can sense only those groupings of perceptual elements which possess enough "statistical inertia" to drive its cooperative-competitive feedback exchanges toward a non-zero stable equilibrium configuration. The emergent patterns in FIGS. 10-17 are thus as important for what they do not show as they are for what they do show. All possible groupings of the oriented input elements could, in principle, have been generated, since all possible groupings of the cooperative-competitive interaction were capable of receiving inputs.

In order to compare and contrast BC System properties with other approaches, one can interpret the distribution of oriented activities at each input position as being analogous to a local probability distribution, and the final BC System pattern as being the global decision that the system reaches and stores based upon all of its local data. The figures show that the BC System regards many of the possible groupings of these local data as spurious, and suppresses them as being functional noise.

In the BC System, the only "external parameters" are the input patterns themselves. Each input pattern defines a different set of boundary conditions for the BC System, and this difference, in itself, generates different segmentations. The BC System, therefore, does not need extra external parameters, because it contains a closed-loop process which regulates its own convergence to a symmetric and coherent configuration via its real-time competitive-cooperative feedback exchanges.

The dynamics of the BC System clarify the relevance of probabilistic concepts to the segmentation process. In particular, the distributions of oriented activities at each input position play the role of local probability distributions. On the other hand, within the BC System, these distributions emerge as part of a real-time reaction to input patterns, rather than according to predetermined constraints on probabilities. The BC System does not incorporate hypotheses about which images will be processed into its probability distributions. Such knowledge is not needed to achieve rapid preattentive segmentation.

EQUIVALENTS

This completes the description of the present invention. While the above-described embodiment is preferred, other configurations will be readily apparent to those skilled in the art. For example, Equation A22 could be revised as:

$$\frac{d}{dt} V_{ijk} = -V_{ijk} + h(Z_{ijk}) - (V + j) \sum_{(p,q)} h(Z_{pqk}) W_{pqij}$$

$$V'_{ijk} = [V_{ijk}]^+$$

in order to more strongly sharpen the V feedback signal.

Also, as one alternative to the on-cell subfield of the dipole field described in Equations A6–A8 of Section 4C, the following may be substituted:

For simplicity, we assume that the output signals from $W_{ijk}$ potentials equal the potentials themselves, which are always nonnegative. Each $W_{ijk}$ influences potentials $Y_{ijm}$ at the second competitive stage via a shunting on-center off-surround interaction across orientations m at each position (i,j):

$$\frac{d}{dt} Y_{ijk} = \quad (A29)$$

$$Y_{ijk} + (B - Y_{ijk}) \sum_m W_{ijk} C_{mk} - (Y_{ijk} + D) \sum_m W_{ijk} E_{mk}$$

where:

$$C_{mk} = C \exp[-\mu(m - k)^2] \quad (A30)$$

and $$E_{mk} = E \exp[-\nu(m - k)^2]. \quad (A31)$$

Equation A29 says that input $W_{ijk}$ excites orientation k maximally and nearby orientations m with an exponentially decreasing strength $C_{mk}$ at each position (i,j). Input $W_{ijk}$ also inhibits orientations m with an exponentially decreasing strength $E_{mk}$ at each position (i,j). Since $\mu < \nu$, the definitions A30 and A31 permit $W_{ijk}$ to generate maximal inhibition at, or near, the orientation K that is perpendicular to k. In addition, the responses $Y_{ijk}$ tend to normalize the inputs $W_{ijk}$ since, at equilibrium, $$Y_{ijk} = \frac{{}_mW_{ijm} BC_{mk} - DE_{mk}}{1 + {}_mW_{ijm} C_{mk} + E_{mk}} \quad (A32)$$

By A32, $Y_{ijk}$ is sensitive to ratios of weighted $W_{ijk}$ values if the coefficients $C_{mk}$ and $E_{mk}$ in A30 and A31 are sufficiently large.

The terms "contrast" or "image contrast", have been used throughout, in connection with dark and light shading. However, more generally, the terms include gradients of image signals, i.e., gradations in signal strength. Furthermore, such signals may include signals throughout the entire spectrum, such as, infra-red radiation signals, radar ranging signals, etc. Also, the term "image" is meant to include any two-dimensional, spatially ordered array of signal intensities.

Thus, the invention is only to be limited in scope by the language of the following claims and equivalents.

We claim:

1. A Boundary Contour System for detecting the boundaries of images having contrast distribution comprising:
   (a) mask means responsive to signals corresponding to said contrast distribution for weighting such signals with an orientational weighting function to produce mask output signals proportional to the degree of orientational congruence between the weighting function and the contrast distribution;
   (b) node means responsive to said mask output signals for enhancing said mask signals by suppressing the strength of mask output signals emanating from regions of the image of homogeneous contrast distribution to produce enhanced orientational mask signals;
   (c) feedback means responsive simultaneously to the orientational signals emanating from either side of spatial domains about a region of said image for generating a feedback signal to said node means when the orientated signals from both sides of said spatial domains are of sufficient value and orientation to indicate that a boundary contour is present in the region of the image between said domains.

2. The system of claim 1 wherein the image is formed of pixels representing light intensities of a visual image.

3. A system for detecting and defining the boundaries of perceptually significant domains in a spatial image having distinct contrast distribution comprising:
   (a) an array of families of oriented masks for sampling said image, with each family of masks corresponding to a respective position relative to said image, and with each such mask in a family corresponding to a different orientation relative to said image and each such mask providing a mask output signal proportional to the degree of congruence between the weighting function of the mask function and the distribution of contrasts in the image region sampled by said mask, and wherein said output signal is sensitive to the position, orientation of the contrast and amount of contrast in the regions sampled by the image and insensitive to the direction of contrast in the region sampled by the image;
   (b) a first competitive stage comprising a first array of network nodes, one for each mask position and orientation, to which said mask output signals are coupled and wherein mask signals of a given orientation exert an excitatory effect upon nodal signals of similar orientation at a corresponding nodal position of the first array of network nodes and exert an inhibitory effect upon nodal signals of similar orientation at proximate neighboring nodes of the first array;

(c) a second competitive stage comprising a second array of network nodes, one for each node in said first array, to which the respective nodal signals from the first competitive stage are respectively coupled and wherein nodal signals from the first competitive stage exert an inhibitory effect on nodal signals of other dissimilar orientations and exert an excitatory effect on nodal signals of similar orientation at corresponding nodal positions of the second competitive stage;

(d) a cooperative stage comprising a third array of network nodes, one for each node in the second array, each such node of the third array being coupled to a plurality of nodes of the second array within two domains, one on either side of the corresponding node in the second array, and wherein to the extent there is sufficient alignment, as sensed from said signals, of the orientation of the plurality of nodes in both domains, with the orientation of such node of the third array an alignment signal is generated at such node of the third array;

(e) a feedback stage comprising:
a fourth array of network nodes, one for each node in the third array, to which respective alignment signals are coupled and wherein alignment completion signals of a given orientation exert an excitatory effect on nodal signals of similar orientation at a corresponding nodal position of the fourth array of network nodes and exert an inhibitory effect on signals of similar orientation at neighboring nodes of the fourth array; and (f) a means for coupling the signals from respective nodes of said fourth array to the respective nodes of the first array.

4. A method for detecting and defining the boundaries of perceptually significant domains in a spatial image having distinct contrast distribution comprising:

(a) sampling said image with an array of families of oriented masks, with each mask in a family providing a mask output signal proportional to the degree of congruence between the weighting function of the mask and the distribution of contrasts in the image region sampled by said mask;

(b) coupling said mask signals to respective nodes of a first array of network nodes, one for each mask position and orientation, such that mask signals of a given orientation exert an excitatory effect upon nodal signals of similar orientation at a corresponding nodal position of the first array of network nodes and exert an inhibitory effect upon nodal signals of similar orientation at proximate neighboring nodes of the first array;

(c) coupling the nodal signals of the first array to respective nodes of a second array of network nodes, one for each node in said first array, such that nodal signals from the first array exert an inhibitory effect on nodal signals of dissimilar orientations and exert an excitatory effect on nodal signals of similar orientations at corresponding nodal positions of the second array;

(d) coupling the nodal signals from a plurality of nodes in the second array within two domains on either side of a given node in the second array to a respective node in the third array corresponding to said given node in the second array, and wherein, to the extent there is sufficient alignment of the orientation of the plurality of nodes in both domains, as sensed from said nodal signals, with the orientation of such node of the third array, generating alignment signals from each such node of the third array;

(e) coupling the alignment signals to a fourth array of network nodes, one for each node in the third array, such that signals of a given orientation exert an excitatory effect on nodal signals of similar orientation at a corresponding nodal position of the fourth array of network nodes and exert an inhibitory effect on signals of similar orientation at neighboring nodes of the fourth array; and (f) coupling the signals from respective nodes of said fourth array to the respective nodes of the first array to provide a feedback signal at each such node of the first array.

5. A Boundary Contour System for detecting the boundaries of images having contrast distribution comprising:

(a) mask means with orientation k and centered at position i, j, responsive to preprocessed signals $s_{pq}$ corresponding to said contrast distribution for producing an output signal $J_{ijk}$ equal to $$\frac{[U_{ijk} - \alpha V_{ijk}]^+ + [V_{ijk} - \alpha U_{ijk}]^+}{1 + \beta(U_{ijk} + V_{ijk})}$$

where $$U_{ijk} = \sum_{(p,q) \in L_{ijk}} S_{pq}$$
$$V_{ijk} = \sum_{(p,q) \in R_{ijk}} S_{pq},$$

(b) first node means responsive to said mask output signals $J_{ijk}$ for actuating a first potential $W_{ijk}$ and inhibiting second potential $W_{pqk}$ if $|p-1|^2 + |q-j|^2$ is sufficiently small;

(c) second node means responsive to potential $W_{ijk}$ and a potential perpendicular thereto $W_{ijK}$ for producing third and fourth potentials $X_{ijk}$ and $X_{ijK}$ representing competition between $W_{ijk}$ and $W_{ijK}$ at their target potentials;

(d) a shunting network for interacting the first, second, third and fourth potentials at each position i,j, to produce fifth and sixth potentials $Y_{ijk}$ and $Y_{ijK}$ which satisfy the equation $$\frac{d}{dt} Y_{ijk} = -DY_{ijk} + (E - Y_{ijk}) O_{ijk} - Y_{ijk} \sum_{m \neq k} O_{ijm}$$

wherein D expresses the rate of passive decay of activity; and E expresses the saturation level of $Y_{ijk}$;

(e) feedback means responsive simultaneously to the said potentials emanating from either side of spatial domains about a region of said image for generating a feedback signal to said first node means when the potentials from both domains are of sufficient value and orientation to indicate that a boundary contour is present in the region of the image between domains.

6. The system of claim 5 wherein the output of the first and second node means is normalized to insure that the potentials resulting from all orientations for a given position is bounded.

7. The system of claim 6 wherein the value of the third and fourth potentials $X_{ijk}$ and $X_{ijK}$ is proportional to the ratio of the potential for a given activated orientation versus the potential of the sum of all other actuated orientations at said given orientation.

* * * * *